(12) United States Patent
Kwon et al.

(10) Patent No.: US 8,651,896 B2
(45) Date of Patent: Feb. 18, 2014

(54) ELECTRICAL CONNECTING MEMBER FOR SECONDARY BATTERY

(71) Applicant: LG Chem, Ltd., Seoul (KR)

(72) Inventors: Gi-Hwan Kwon, Seoul (KR); Yongho Cho, Chungcheongbuk-do (KR); Seunghyun Bang, Seoul (KR); Hakjun Lee, Seoul (KR); Hosang Kwon, Seongnam-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/761,762

(22) Filed: Feb. 7, 2013

(65) Prior Publication Data

US 2013/0202948 A1    Aug. 8, 2013

Related U.S. Application Data

(62) Division of application No. 13/611,752, filed on Sep. 12, 2012, now Pat. No. 8,556,661, which is a division of application No. 12/669,410, filed as application No. PCT/KR2008/004157 on Jul. 16, 2008, now Pat. No. 8,287,313.

(30) Foreign Application Priority Data

Jul. 16, 2007  (KR) .................. 10-2007-0071389
Oct. 13, 2007  (KR) .................. 10-2007-0103290
Jun. 26, 2008  (KR) .................. 10-2008-0060553

(51) Int. Cl.
*H01R 4/02*  (2006.01)

(52) U.S. Cl.
USPC ..................................... 439/627

(58) Field of Classification Search
USPC ......... 439/627, 786, 890, 842, 855; 429/158, 429/149, 121, 82, 174; 174/73.1, 127
See application file for complete search history.

(56) References Cited

U.S. PATENT DOCUMENTS

| 2,487,521 A | * | 11/1949 | Buckley ..................... 439/732 |
| 2,666,800 A |   | 1/1954  | Hoynes |
| 2,786,883 A |   | 3/1957  | Zelt |
| 2,901,526 A |   | 8/1959  | Alton et al. |
| 2,983,899 A | * | 5/1961  | Amodio et al. .............. 439/786 |

(Continued)

FOREIGN PATENT DOCUMENTS

| EP | 1 953 849 A2 | 8/2008 |
| JP | 2000-106164 A | 4/2000 |

(Continued)

*Primary Examiner* — Alexander Gilman
(74) *Attorney, Agent, or Firm* — Birch, Stewart, Kolasch & Birch, LLP

(57) ABSTRACT

Disclosed herein is a connection member for secondary batteries to achieve the electrical connection in a battery pack including two or more cylindrical secondary batteries in a physical contact manner, the connection member including an outer circumferential contact part contacting an electrode terminal of a lower battery cell along the outer circumferential region of the electrode terminal of the lower battery cell, such that the outer circumferential contact part can be electrically connected to the electrode terminal of the lower battery cell in a surface contact manner and a central contact part contacting an electrode terminal of an upper battery cell or the central region of a sidewall of the battery pack for providing an elastic contact force to the entire connection member mounted between the electrode terminals of the respective battery cells or between the electrode terminals of the battery cells and the sidewall of the battery pack.

4 Claims, 15 Drawing Sheets

(56) References Cited

U.S. PATENT DOCUMENTS

| | | |
|---|---|---|
| 3,615,867 A | 10/1971 | Cich et al. |
| 3,923,549 A | 12/1975 | Mabuchi et al. |
| 3,980,388 A * | 9/1976 | Nailor, III ............... 439/752 |
| 3,992,227 A | 11/1976 | Persson |
| 5,000,699 A | 3/1991 | Nadin |
| 5,874,181 A | 2/1999 | Tam |
| 5,900,332 A | 5/1999 | Marukawa et al. |
| 5,965,292 A | 10/1999 | Kim et al. |
| 6,558,835 B1 | 5/2003 | Kurisu et al. |
| 6,599,660 B2 | 7/2003 | Oda et al. |
| 6,676,455 B2 | 1/2004 | Machado |
| 7,458,862 B2 | 12/2008 | Zhao et al. |
| 7,507,124 B2 | 3/2009 | Kim |
| 7,611,384 B2 * | 11/2009 | Maguire ............... 439/627 |
| 7,758,995 B2 | 7/2010 | Kim et al. |
| 7,879,478 B2 | 2/2011 | Kim et al. |
| 8,100,723 B2 | 1/2012 | Vetter et al. |
| 2003/0143459 A1 | 7/2003 | Kunimoto et al. |
| 2005/0079408 A1 | 4/2005 | Hirano |

FOREIGN PATENT DOCUMENTS

| | | |
|---|---|---|
| JP | 2002-246006 A | 8/2002 |
| JP | 2006-278026 A | 10/2006 |
| KR | 10-1997-0077778 A | 12/1997 |
| KR | 10-1998-045791 A | 9/1998 |
| KR | 10-0413381 A | 12/2003 |
| WO | WO 2008/147153 A1 | 12/2008 |

* cited by examiner

ELECTRICAL CONNECTING MEMBER FOR SECONDARY BATTERY

CROSS REFERENCE TO RELATED APPLICATIONS

This application is a Divisional of co-pending U.S. application Ser. No. 13/611,752, filed on Sep. 12, 2012, which is a Divisional of U.S. application Ser. No. 12/669,410 filed on Jan. 15, 2010, now U.S. Pat. No. 8,287,313, which is the National Phase of PCT International Application No. PCT/KR2008/004157 filed on Jul. 16, 2008, which claims priority under 35 U.S.C. 119(a) to Patent Application No. 10-2007-0071389 filed in the Republic of Korea on Jul. 16, 2007, Patent Application No. 10-2007-0103290 filed in the Republic of Korea on Oct. 13, 2007, and Patent Application No. 10-2008-0060553 filed in the Republic of Korea on Jun. 26, 2008. The entire contents of all of the above applications are hereby incorporated by reference.

FIELD OF THE INVENTION

The present invention relates to an electric connection member for secondary batteries, and, more particularly, to a connection member for secondary batteries to achieve the electrical connection in a battery pack including two or more cylindrical secondary batteries in a physical contact manner, the connection member including an outer circumferential contact part contacting an electrode terminal of a lower battery cell along the outer circumferential region of the electrode terminal of the lower battery cell, such that the outer circumferential contact part can be electrically connected to the electrode terminal of the lower battery cell in a surface contact manner, for minimizing the change of resistance at the contact region against an external force and restraining a possibility that the electrode terminal of the lower battery cell is depressed, and a central contact part contacting an electrode terminal of an upper battery cell or the central region of a sidewall of the battery pack for providing an elastic contact force to the entire connection member mounted between the electrode terminals of the respective battery cells or between the electrode terminals of the battery cells and the sidewall of the battery pack.

BACKGROUND OF THE INVENTION

As mobile devices have been increasingly developed, and the demand of such mobile devices has increased, the demand of secondary batteries has also sharply increased as an energy source for the mobile devices.

Depending upon kinds of external devices in which the secondary batteries are used, the secondary batteries may be used in the form of a single battery or in the form of a battery pack having a plurality of unit cells electrically connected to one another. For example, small-sized devices, such as mobile phones, can be operated for a predetermined period of time with the power and the capacity of one battery. On the other hand, a secondary battery pack needs to be used in middle- or large-sized devices, such as laptop computers, portable digital versatile disc (DVD) players, small-sized personal computers (PCs), electric vehicles, and hybrid electric vehicles, because high power and large capacity are necessary for the middle- or large-sized devices.

The battery pack is manufactured by connecting a protection circuit to a core pack having a plurality of unit cells (secondary batteries) connected in series and/or in parallel to one another. When prismatic batteries or pouch-shaped batteries are used as the unit cells, the prismatic batteries or the pouch-shaped batteries are stacked such that large-sized surfaces of the prismatic batteries or the pouch-shaped batteries face each other, and then electrode terminals of the prismatic batteries or the pouch-shaped batteries are connected to one another by connection members, such as bus bars. Consequently, when a three-dimensional secondary battery pack having a hexahedral structure is to be manufactured, the prismatic secondary batteries or the pouch-shaped secondary batteries are preferably used as unit cells of the secondary battery pack.

On the other hand, cylindrical secondary batteries generally have electric capacities larger than the prismatic secondary batteries or the pouch-shaped secondary batteries. However, it is difficult to arrange the cylindrical batteries in a stacked structure due to the external shape of the cylindrical secondary batteries. When the secondary battery pack is constructed generally in a line-type structure or in a plane-type structure, though, the cylindrical secondary batteries are structurally more advantageous than the prismatic secondary batteries or the pouch-shaped secondary batteries.

Consequently, a battery pack having a plurality of cylindrical secondary batteries connected in series to or in parallel and series to one another is widely used in laptop computers, portable DVD players, and portable PCs. The secondary battery pack may be constructed in various core pack structures. For example, the core pack of the battery pack may be generally constructed in a 2P(parallel)-3S(series) line-type structure, a 2P-3S plane-type structure, a 2P-4S line-type structure, a 2P-4S plane-type structure, a 1P-3S line-type structure, or a 1P-3S plane-type structure.

The parallel connection structure is achieved by adjacently arranging two or more cylindrical secondary batteries in the lateral direction thereof, while electrode terminals of the cylindrical batteries are oriented in the same direction, and connecting the electrode terminals of the cylindrical batteries to one another using connection members by welding. The cylindrical secondary batteries connected in parallel to one other may be referred to as a "bank."

The series connection structure is accomplished by arranging two or more cylindrical secondary batteries in the longitudinal direction thereof such that electrode terminals of the cylindrical batteries having opposite polarities are successively disposed one after another, or adjacently arranging two or more cylindrical batteries in the lateral direction thereof, while electrode terminals of the cylindrical batteries are oriented in opposite directions, and connecting the electrode terminals of the cylindrical secondary batteries to one another using connection members by welding.

The electrical connection between the cylindrical secondary batteries is generally achieved by spot welding using thin connection members, such as metal plates (for example, nickel plates).

FIG. 1 typically illustrates a battery pack constructed in a 2P-3S plane-type structure in which batteries are electrically connected to one another by spot welding. For easy understanding, the coupling between the batteries constituting the battery pack of the 2P-3S plane-type structure is shown in an exploded view.

As shown in FIG. 1, three pairs of secondary batteries 20 and 21, connected in parallel to each other for each pair, are connected in series to one another via metal plates 30 to constitute a core pack 10.

FIG. 2 is a typical view illustrating a battery module 50 in which a protection circuit module is connected to the core pack of FIG. 1.

As shown in FIG. 2, secondary batteries 20 and 21 are connected to the protection circuit module 90 via a cathode conducting wire 60 and an anode conducting wire 70 connected to the metal plates 30 and flexible printed circuit boards (FPCB) 80 connected to the conducting wires. The electrical connection between the metal plates 30 and the protection circuit module 90 is mostly achieved by soldering.

Generally, a battery pack using secondary batteries as unit cells is repeatedly charged and discharged during the use of the battery pack, and the battery pack uses lithium secondary battery, which exhibits low safety in abnormal conditions, such as external impact, dropping, penetration of a needle-shaped body, overcharge, overcurrent, etc., as a unit cell. In order to solve such a safety-related problem, therefore, a safety element, such as a protection circuit module, is included in the battery pack. The safety element acquires information, such as voltage, at a corresponding terminal connection region of the battery pack to perform a predetermined safety process, thereby securing the safety of the battery pack. Consequently, when the connection state of the corresponding region is variable, for example, the resistance value of the terminal connection region changes due to vibration, the detected information is inaccurate, and therefore, the safety element cannot perform the desired process. For this reason, the electrical connection between the battery cells and the protection circuit in the battery pack is generally achieved by soldering.

Also, it is necessary to connect a plurality of battery cells in series or in parallel to one another to constitute a high-power, large-capacity battery pack. In addition, a stable coupling method that is capable of minimizing the resistance change of the terminal connection region is required to uniformly maintain the efficiency of the battery pack. Generally, the electrical connection between the battery cells is achieved by soldering or welding, preferably spot welding.

However, the welding or soldering process between the battery cells has the following problems.

Specifically, the welding or soldering process requires worker's skilled technique and know-how. In addition, the control of parameters necessary to decide the intensity of welding must be continuously performed. As a result, the production process is complicated, and the production costs increase, whereby the production efficiency lowers. Also, a short circuit may occur at the welded region, due to the vibration generated from the battery pack or external impact applied to the battery pack, at the time of directly welding or soldering the battery cells. In addition, electrical or thermal damage may be caused between the battery cells and the connection members, whereby the safety of the batteries is threatened, and the defective product rate increases. Furthermore, when some of the battery cells become defective, during the manufacturing or use of the battery cells, all the battery cells constituting the battery pack must be discarded.

Consequently, there is a high necessity for a technology that is capable of substituting for the connection method based on such welding or soldering, which threatens the safety of the batteries and requires a complicated working process, and, at the same time, reusing the remaining battery cells, although some of the battery cells are defective, while stably securing the connection structure between the battery cells.

Meanwhile, for a battery pack using primary batteries, various attempts have been made to achieve the electrical connection between the respective batteries. For example, Korean Patent No. 0413381 discloses a technology for forming conductive coils at opposite ends of battery cases to electrically connect batteries to one another. U.S. Pat. No. 525, 037 discloses a technology for mounting metal plates, which are bent to exhibit elasticity, at opposite ends of batteries to achieve electrical connection between the respective batteries.

However, the above-mentioned technologies have a problem in that it is required for connection members to exhibit elasticity enough to fix the battery cells and stably connect electrode terminals to one another, and therefore, connection members exhibiting low elasticity are limited in use. Especially, the technology using the conduction coils has problems in that the sectional area of a wire constituting each coil is small, and the connection length of the wire is relatively large, whereby the electrical resistance increases. The increase of the electrical resistance causes power loss and increases the amount of heat generated, whereby the stable connection between the batteries may be obstructed. Also, for the technology using the metal plates that are bent to have elasticity, the metal plates may lose their elasticity or break when an excessive force is applied to the metal plates at the time of inserting the battery cells into the pack case, or when the metal plates are repeatedly used, with the result that, when external impact is applied to the battery cells, the battery cells may be separated from the pack case or the electrical connection between the battery cells may be cut off.

Furthermore, the above-mentioned connection member is limited to apply to the previously described secondary battery pack due to the variable connection state at the corresponding region.

Also, in order to achieve the electric connection between the battery cells in a mechanical contact manner, without using welding or soldering, it is required that partitions necessary to mount the connection members to the pack case be located between the battery cells, as in the conventional arts. However, the provision of the partitions increases the size of the battery pack, which is far from the latest tendency to pursue the reduction in size, weight, and thickness. In addition, it is preferred for a battery pack including a plurality of battery cells to be under a uniform operating condition in the aspect of the operational efficiency. However, the operating conditions of the battery cells mounted in the receiving parts divided by the partitions may be different from each other for the respective receiving parts, when external impact is applied to the battery pack, through the provision of the partitions.

In this aspect, a method may be considered of mounting mechanical contact type connection members between the battery cells at a very high elastic pressing force in a structure having no partitions. In this method, however, a material, such as polymer resin, for the pack case is slowly deformed by stress during the use of the pack case for a long period of time, which is called a creep phenomenon. Consequently, excessively high elastic pressing force of the connection members causes the occurrence of stress at the pack case, which leads to the creep phenomenon. As a result, the distance between the battery cells gradually increases, and therefore, the electrical connection between the battery cells is unstable. This phenomenon may be serious especially for a device of which the long-term use is required. Consequently, the connection method based on the primary batteries cannot be applied to a battery pack, based on secondary batteries, of which the long-term use is required through repeated charge and discharge, without any modification.

Meanwhile, a cylindrical battery is constructed in a structure in which a jelly-roll is mounted in a metal container, and a protruding cathode terminal is formed at one end of the container while a flat anode terminal is formed at the other end of the container. Since a cap assembly is mounted to the top of the jelly-roll in a crimping structure, the cathode terminal region exhibits structural stability against an external force. On the other hand, since the jelly-roll directly faces the inner bottom of the container, the anode terminal (i.e., the bottom of the container) is deformed by an external force, with the result that a short circuit may occur between electrode plates of the jelly-roll.

In a battery pack including a plurality of battery cells, such a short circuit causes a very serious problem in the aspect of the safety. The inventors of the present invention have experimentally confirmed that such a short circuit occurred in a structure in which connection members, such as nickel plates, are coupled to the electrode terminals of the battery cells by welding.

Consequently, there is a high necessity to provide a connection member for secondary batteries that is capable of substituting for the connection method based on welding or soldering, and securing the stable connection structure between the battery cells and the safety of the batteries while not causing the increase in size of the battery pack.

SUMMARY OF THE INVENTION

Therefore, the present invention has been made to solve the above problems, and other technical problems that have yet to be resolved.

Specifically, it is an object of the present invention to provide a connection member for secondary batteries that is capable of stably achieving the electrical connection between two or more secondary battery cells without performing a soldering or welding process, which requires a complicated working process, and constructed in a specific structure in which the electrical connection thereof is possible, an assembly process is easily performed, and the connection member is freely attached and detached as needed.

It is another object of the present invention to provide a connection member for secondary batteries that does not cause the increase in size of a battery pack and that is capable of stably maintaining the connection between the battery cells, even when in use for a long period of time, and securing the safety of the batteries against an external force.

In accordance with one aspect of the present invention, the above and other objects can be accomplished by the provision of a connection member for secondary batteries to achieve the electrical connection in a battery pack including two or more cylindrical secondary batteries in a physical contact manner, the connection member comprising: an outer circumferential contact part contacting an electrode terminal of a battery cell located below the connection member (a lower battery cell) along the outer circumferential region of the electrode terminal of the lower battery cell, such that the outer circumferential contact part can be electrically connected to the electrode terminal of the lower battery cell in a surface contact manner, for minimizing the change of resistance at the contact region against an external force and restraining a possibility that the electrode terminal of the lower battery cell is depressed; and a central contact part contacting an electrode terminal of a battery cell located above the connection member (an upper battery cell) or the central region of a sidewall of the battery pack for providing an elastic contact force to the entire connection member mounted between the electrode terminals of the respective battery cells or between the electrode terminals of the battery cells and the sidewall of the battery pack.

Consequently, the connection member for secondary batteries according to the present invention does not need a welding or soldering process for electrical connection between the electrode terminals of the battery cells. The connection between the battery cells is stably maintained only by the coupling of the connection member to the battery cells. Therefore, it is possible to prevent the occurrence of short circuits of the battery cells, which may be caused during soldering or welding. Also, the change in resistance at the connection regions does not deviate from a desired degree of reliability although external impact is applied to a battery pack, and it is possible to prevent the occurrence of a short circuit of the lower battery cell due to the depression of the electrode terminal of the lower battery cell. At the same time, it is possible to easily perform a battery pack assembly process and to achieve stable coupling between the electrode terminals of the battery cells.

Also, when some of the battery cells are defective during the assembly or the use of the battery pack, the battery cells may be easily separated from each other, with the result that it is possible to solve a problem in that all the battery cells constituting the battery pack will be discarded due to the defectiveness of some battery cells or the connection member. Also, during the manufacture of the battery pack, no partition is required when the connection member is mounted between the battery cells. Consequently, the size of the battery pack is not increased although the connection member is connected to the electrode terminals of the battery cells without using welding or soldering.

Furthermore, the connection member is elastically connected to the electrode terminals of the battery cells while being somewhat pressed, and therefore, the change in resistance at the connection regions does not deviate from a desired degree of reliability although external impact is applied to the battery pack. That is, the above-described structure enables a control member, such as a battery management unit (BMU), to accurately detect the temperature and voltage of the battery cells, whereby it is possible to secure the normal operation of the battery. On the other hand, the elastically pressed state of the connection member mounted at the corresponding region is not large enough to cause a creep phenomenon of the pack case as previously described.

The connection member according to the present invention may be mounted between the respective electrode terminals of the battery cells to achieve the electrical connection between the battery cells or may be mounted between the electrode terminals of the battery cells and the sidewall of the battery pack.

In the former case, the connection member may be connected to the electrode terminal of the lower battery cell in a physical contact manner and may be connected to the electrode terminal of the upper battery cell in a mechanical coupling manner. In the latter case, the connection member may be connected to the electrode terminal of the lower battery cell in a physical contact manner and may be supported by the sidewall of the battery pack.

A characteristic of the connection member according to the present invention is that the outer circumferential contact part contacts the electrode terminal of the lower battery cell along the outer circumferential region of the electrode terminal of the lower battery cell, such that the outer circumferential contact part can be electrically connected to the electrode terminal of the lower battery cell in the surface contact manner.

The inventors of the present invention have performed various tests on connection members constructed in various structures to achieve electrical connection in a physical contact manner and found that it is required to secure a maximum contact area, even when the position of the connection member or the battery cells is changed, in order that the change in resistance at the connection regions does not deviate from a desired degree of reliability although external impact is applied to a battery pack, and, it is required for the connection member to be connected to the electrode terminal of the lower battery cell along the outer circumferential region of the lower battery cell in a surface contact manner with a large radius in order to secure such a maximum contact area. That is, when the connection member is connected to the electrode terminal of the lower battery cell along the outer circumferential region of the lower battery cell in the surface contact manner with a large radius, as described above, the decrease of the contact area is minimized although the position of the connection member or the battery cells is changed due to external impact.

In the above description, the expression 'outer circumferential region' is a concept including the outer circumference end of the electrode terminal of the lower battery cell and the region extending from the outer circumference end of the electrode terminal toward the central axis of the electrode terminal. Consequently, the connection member contacts the electrode terminal of the lower battery cell with the largest radius through the outer circumferential contact part.

Also, since the outer circumferential contact part of the connection member contacts the outer circumferential region of the lower battery cell in the surface contact manner, as described above, it is possible to minimize a possibility that the electrode terminal of the lower battery cell is depressed by the connection member and/or the electrode terminal of the upper battery cell when an external force is applied to the battery pack.

As previously described, the cylindrical secondary battery is constructed in a structure in which the jelly-roll directly faces the metal container at the anode region, with the result that the electrode terminal may be easily depressed by an external force. Preferably, therefore, the electrode terminal of the lower battery cell is an anode, and the electrode terminal of the upper battery cell is a cathode.

The prevention of the occurrence of a short circuit due to the depression of the electrode terminal can be confirmed through experiments.

FIG. 3 is an X-ray fluoroscopic view illustrating a (conventional) battery pack constructed in a structure in which the battery module of FIG. 2 is mounted in the pack case, and FIG. 4 is an X-ray fluoroscopic view illustrating the change of the battery pack after dropping the battery pack from a height of 1 m in a state in which the left side end of the battery pack is directed toward the floor.

As shown in FIG. 4, the connection member (nickel plate) is coupled to the anode terminal of the battery cell a and the cathode terminal of the battery cell b by welding. When impact due to the dropping was applied to the battery pack, the protruding cathode terminal applied strong impact to the flat anode terminal through the nickel plate, with the result that the anode terminal at the lower end of the metal container was depressed (see x region). FIG. 4 illustrates the structure in which the anode terminal of the battery cell a and the cathode terminal of the battery cell b were spaced apart from each other again by a restoring force of the nickel plate after the dropping of the battery pack. However, it can be seen that the anode terminal at the lower end of the metal container is partially depressed. The depressed anode terminal contacted the corresponding region of the jelly-roll in the metal container, with the result that a short circuit occurred.

On the other hand, FIG. 5 is an X-ray fluoroscopic view illustrating the change of a battery pack constructed in a structure in which the cathode terminal and the anode terminal are electrically connected to each other by a connection member according to a preferred embodiment of the present invention in a physical contact manner after dropping the battery pack under the same condition as the above As shown in FIG. 5, the outer circumferential contact part of the connection member is connected to the outer circumferential region of the anode terminal of the lower battery cell a in a surface contact manner, and the central contact part of the connection member is coupled to the cathode terminal of the upper battery cell b in a mechanical coupling manner. Although strong impact was applied to the battery pack due to the dropping of the battery pack, a considerable amount of the impact was dampened by the elastic structure of the central contact part, and the remaining impact was transmitted toward the outer circumference of the anode terminal by the outer circumferential contact part. As a result, the depression of the anode terminal, which occurred in FIG. 4, did not occur (see y region), and therefore, a short circuit of the jelly-roll did not occur.

As can be seen from the above-mentioned results of the experiments, the connection member according to the present invention is capable of effectively preventing the occurrence of an internal short circuit due to external impact by virtue of the structural characteristics of the outer circumferential contact part and the central contact part.

In a preferred embodiment, the outer circumferential contact part is formed generally in a shape corresponding to the outer circumferential shape of the electrode terminal of the lower battery cell. Since the outer circumferential contact part is formed in the above-defined shape, the contact between the outer circumferential contact part and the electrode terminal of the lower battery cell is achieved with the largest radius as previously described. In this structure, it is preferred for the outer circumferential contact part to have a contact interface of a size equivalent to 10% to 70% of the surface area of the electrode terminal of the upper battery cell. It is preferred to increase the size of the contact interface for surface contact when considering the resistance at the contact region; however, the increase in size of the outer circumferential contact part causes the decrease in size of the central contact part. Consequently, it is necessary for the contact interface to be within the above-specified range.

Preferably, the outer circumferential contact part includes one or more downward extensions for covering the upper-end side of the lower battery cell to securely maintain the coupling between the connection member and the electrode terminal of the lower battery cell. Consequently, it is possible to achieve more stable coupling between the connection member and the lower battery cell by the provision of the downward extensions. The downward extensions may be formed in various shapes. For example, the downward extensions may be constructed in a variable skirt structure in which the downward extensions extend from the outer circumferential contact part. The variable skirt structure is bent in correspondence to the outside of the lower battery cell, and therefore, the variable skirt structure assists the connection member to be stably fixed to the electrode terminal of the lower battery cell, even when an external force is applied to the battery pack. Of course, however, the downward extensions may be constructed in a non-variable skirt structure.

Another characteristic of the connection member according to the present invention is that the central contact part contacts the electrode terminal of the upper battery cell or the central region of the sidewall of the battery pack to provide an elastic contact force to the entire connection member. Since the outer circumferential contact part is formed at the outer circumference of the connection member, such that the change in resistance at the connection regions does not deviate from a desired degree of reliability, and the depression of the electrode terminal of the lower battery cell due to an external force is prevented, the central contact part is located at the central region of the connection member, and therefore, the connection instability is not caused even when the position of the connection member or the battery cell is changed due to external impact. Furthermore, since the central contact part provides the elastic contact force to the entire connection member mounted between the respective battery cells or between the battery cells and the sidewall of the battery pack, it is possible to achieve a desired electrical connection in the battery pack without the provision of additional mounting parts, such as partitions, thereby not causing the increase in size of the battery pack. Also, a considerable amount of the applied external impact is dampened by the elastic structure to minimize the amount of the external impact transmitted to the outer circumferential contact part, thereby preventing the occurrence of a short circuit of the jelly-roll due to the depression of the electrode terminal of the lower battery cell as previously described.

In a preferred embodiment, the central contact part elastically protrudes upward with respect to the outer circumferential contact part. The central contact part may protrude in various structures based on the shape of the electrode terminal of the upper battery cell corresponding to the central contact part or the shape of the side wall of the battery pack.

For example, when the central contact part is connected to the cathode terminal of the upper battery cell, the central contact part may include a coupling part variably coupled to gas discharge ports or coupling openings formed at the cathode terminal of the upper battery cell.

Generally, a plurality of gas discharge ports are formed at a cathode terminal of a cylindrical secondary battery to discharge internal gas, generated when the battery cell is abnormal, out of the battery cell. Consequently, the coupling parts of the central contact part are coupled into the gas discharge ports formed at the cathode terminal of the upper battery cell to maintain the stable connection between the connection member and the upper battery cell when external impact or vibration is applied to the battery pack.

The coupling parts may be constructed in various structures, which will be described hereinafter in detail with reference to the relevant drawings.

Preferably, the central contact part is constructed in an upward protruding bridge structure having openings.

From experiments on connection members constructed in various structures, the inventors of the present invention have found that, when the central contact part is constructed in the upward protruding bridge structure having the openings, the central contact part provides an elastic contact force to the entire connection member in a limited installation space. The bridge structure is easily deformed to be mounted to the corresponding region. On the other hand, the bridge structure exhibits high resilience according to the elasticity based on the properties of the material for the connection member. Also, the bridge structure disperses external impact, when the external impact is applied to the battery pack, to minimize the amount of impact transmitted to the lower battery cell, thereby restraining the depression of the electrode terminal of the lower battery cell due to the connection member.

The number and the shape of the openings may vary depending upon the shape of the bridge structure.

In a preferred embodiment, the opening includes one or more auxiliary connection parts connected to the electrode terminal of the upper battery cell, the electrode terminal of the lower battery cell, or the electrode terminals of the upper and lower battery cells while being elastically pressed.

The auxiliary connection parts further increase the elastic force of the connection member. In addition, the auxiliary connection parts prevent the occurrence of an instantaneous short circuit of the electrode terminal, when an external force, such as vibration or bending, is applied to the battery pack.

Preferably, the auxiliary connection parts are tapered downward or upward from the inside of the outer circumferential contact part.

In accordance with another aspect of the present invention, there is provided a connection member for secondary batteries to electrically connect a plurality of secondary battery cells, wherein the connection member is located between the battery cells arranged in the longitudinal direction or in both the longitudinal direction and the lateral direction, the connection member is connected, in an elastic contact manner, to a lower electrode terminal of the front battery cell in the longitudinal direction or to an upper electrode terminal of the rear battery cell in the longitudinal direction, and the connection member is elastically pressed while the connection member is located between the battery cells.

Hereinafter, several concrete examples of the connection member for secondary batteries will be described.

In a first preferred embodiment, the connection member comprises a terminal connection unit for connecting the battery cells arranged in the longitudinal direction in series to each other, and the terminal connection unit comprises: (a) an outer circumferential contact part configured to correspond to the external shape of an electrode terminal of a lower battery cell, the outer circumferential contact part contacting the electrode terminal of the lower battery cell at a region adjacent to the outer circumference of the electrode terminal, the outer circumferential contact part having a predetermined width; (b) upward protruding parts tapered upward from the outer circumferential contact part toward a central axis of the terminal connection unit for elastically supporting the lower battery cell; and (c) protruding coupling parts connected to the respective upward protruding parts in a bridge structure, the protruding coupling parts protruding such that the protruding coupling parts can be elastically coupled to a predetermined region of the upper battery cell.

Consequently, in a battery pack constructed in a structure in which a plurality of battery cells arranged in the longitudinal direction in series connection to each other are mounted in a pack case, the protruding coupling parts are connected to the respective upward protruding parts in the bridge structure, and therefore, it is possible for the connection member to easily electrically connect electrode terminals of the battery cells in the elastic contact manner.

Preferably, the terminal connection unit further comprises a plurality of auxiliary connection parts tapered downward and/or upward from the inside of the outer circumferential contact part.

The auxiliary connection parts further increase the elastic force of the connection member and prevent the occurrence of an instantaneous short circuit of the electrode terminal, when an external force, such as vibration or bending, is applied to the battery pack.

Each upward-tapered auxiliary connection part is constructed in a structure in which the end of each upward-tapered auxiliary connection part is inclined toward the central axis of the connection member to a height higher than that of the outer circumferential contact part. The auxiliary connection parts extending upward to the height higher than that of the outer circumferential contact part can elastically support the upward protruding parts while the connection member is in contact with the electrode terminal of the lower battery cell. Also, the upward-tapered auxiliary connection parts remain connected to the electrode terminal of the upper battery cell. Consequently, the upward-tapered auxiliary connection parts prevent the occurrence of an instantaneous short circuit due to the unstable connection state when an external force is applied to the battery pack, as previously described. Furthermore, when the number of the upward-tapered auxiliary connection parts is two or more, the above-mentioned effects are more stably provided.

On the other hand, each downward-tapered auxiliary connection part is constructed in a structure in which the end of each downward-tapered auxiliary connection part is inclined toward the central axis of the connection member to a height lower than that of the outer circumferential contact part to obtain the above-mentioned effects.

In this case, the upward-tapered auxiliary connection parts may contact the electrode terminal of the upper battery cell (a), and the downward-tapered auxiliary connection parts may contact the electrode terminal of the lower battery cell (b).

In a preferred example, the upward protruding parts extend from the upper inside and the lower inside of the outer circumferential contact part such that the upward protruding parts are tapered upward from the outer circumferential contact part toward the central axis of the connection member. Consequently, the upward protruding parts can be easily inserted into predetermined regions formed at the electrode terminal of the battery cell, and the outer circumferential contact part can elastically contact the lower battery cell.

Preferably, the protruding coupling parts are formed at the left side and the right side, respectively, at a right angle to connection regions between the outer circumferential contact part and the upward protruding parts. Also, the protruding coupling parts are connected to the respective upward protruding parts in the bridge structure. Consequently, it is possible to achieve more elastic coupling between the protruding coupling parts and predetermined regions of the battery cell.

The predetermined regions of the battery cell means regions located at the outside of the electrode terminal of the battery cell. For example, the predetermined regions may include gas discharge port regions formed at the outside of the electrode terminal to discharge internal gas, generated when the battery cell is abnormal, out of the battery cell.

The shape of the protruding coupling parts is not particularly restricted so long as the protruding coupling parts are easily coupled to the predetermined regions of the electrode terminal of the battery cell. For example, the protruding coupling parts may be constructed in a structure in which two or more bridges connecting the respective protruding coupling parts are arranged in a symmetrical fashion, thereby providing more elastic coupling force through the protruding coupling parts constructed generally in the more elastic structure.

For example, the top of each upward protruding part protrudes upward in the vertical sectional shape thereof such that the respective upward protruding parts can be easily inserted into predetermined regions of the electrode terminal. In this case, the respective upward protruding parts are more easily inserted into the predetermined regions of the electrode terminal, and the contact force between the bridges connected to the upward protruding part and the electrode terminal of the battery cell is further improved after the insertion of the respective upward protruding parts into the predetermined regions of the electrode terminal.

As previously described, the downward or upward tapered auxiliary connection parts are formed at the inside of the outer circumferential contact part, and therefore, it is possible for the auxiliary connection parts to further increase the elastic force of the connection member and to prevent the occurrence of an instantaneous short circuit of the electrode terminal, when an external force, such as vibration or bending, is applied to the battery pack.

In another example, ends of the respective auxiliary connection parts are bent in the direction opposite to the taper direction of the corresponding auxiliary connection parts. Consequently, it is possible to prevent the ends of the auxiliary connection parts to damage, for example scratch, the electrode terminal of the battery cell or a worker to be injured during the assembly of the battery pack.

In a second preferred embodiment, the connection member is constructed in a structure in which the connection member is located between the anode terminal of the battery cell and the sidewall of the battery pack in a physical contact manner, and the physical contact type connection member comprises terminal connection units for electrically connecting two or more battery cells arranged in the lateral direction in a physical contact manner, and each of the terminal connection units comprises: (a) an outer circumferential contact part configured to correspond to the external shape of an electrode terminal of the corresponding battery cell, the outer circumferential contact part contacting the electrode terminal of the corresponding battery cell at a region adjacent to the outer circumference of the electrode terminal, the outer circumferential contact part having a predetermined width; and (b) upward protruding parts tapered upward from the outer circumferential contact part toward a central axis of each terminal connection unit for elastically supporting the corresponding battery cell, the terminal connection units being electrically connected to each other in correspondence to the number of the battery cells arranged in the lateral direction.

In a battery pack constructed in a structure in which a plurality of battery cells are laterally arranged in two or more rows in a pack case while the battery cells are electrically connected to one another, it is possible for the connection member to easily electrically connect electrode terminals of the battery cells arranged in the lateral direction (in parallel or in series) of the ends of the battery rows in a physical contact manner.

In this case, each of the terminal connection units may further include auxiliary connection parts tapered downward from the inside of the outer circumferential contact part such that the terminal connection units can be elastically connected to the corresponding electrode terminals.

In a third preferred embodiment, the connection member is constructed in a structure in which the connection member is located between the anode terminal of the battery cell and the sidewall of the battery pack in an elastic physical contact manner, and the connection member comprises terminal connection units for electrically connecting two or more battery cells arranged in the lateral direction in a physical contact manner, each of the terminal connection units comprising: (a) an outer circumferential contact part configured to correspond to the external shape of an electrode terminal of the corresponding battery cell, the outer circumferential contact part contacting the electrode terminal of the corresponding battery cell at a region adjacent to the outer circumference of the electrode terminal, the outer circumferential contact part having a predetermined width; (b) upward protruding parts tapered upward from the outer circumferential contact part toward a central axis of each terminal connection unit for elastically supporting the corresponding battery cell; (c) a pressing part protruding from the upward protruding parts to a predetermined height toward the central axis of each terminal connection unit for achieving the physical contact between the battery cells and the connection member; and (d) a depressed part formed on the central axis of each terminal connection unit in a depressed shape by a depth less than the sum of the height of the upward protruding parts and the height of the pressing part, the terminal connection units being electrically connected to each other in correspondence to the number of the battery cells arranged in the lateral direction.

For example, the upward protruding part may be provided with two or more cut-off parts, having a predetermined width, formed toward the central axis of each terminal connection unit for controlling an elastic force. Of course, the upward protruding part exhibits the elastic force although the cut-off parts are not provided at the upward protruding part. However, a desired elastic force may be changed depending upon the type of the battery pack. Consequently, it is preferred to appropriately control the elastic force by forming the cut-off parts at the upward protruding part. Also, it is preferred for the cut-off parts to be arranged about the central axis of the connection member in a symmetrical structure such that the elastic force is not concentrated at one side of the upward protruding part but uniformly distributed. The cut-off parts may be arranged in various shapes. For example, the cut-off parts are arranged in the shape of a whirlpool to effectively provide a flexible elastic force.

In a fourth preferred embodiment, the connection member comprises a terminal connection unit for connecting the battery cells arranged in the longitudinal direction in series to each other, the terminal connection unit comprising: (a) an outer circumferential contact part configured to correspond to the external shape of the electrode terminal of the lower battery cell, the outer circumferential contact part contacting the electrode terminal of the lower battery cell at a region adjacent to the outer circumference of the electrode terminal, the outer circumferential contact part having a predetermined width; (b) upward protruding parts tapered upward from the outer circumferential contact part toward a central axis of the terminal connection unit for elastically supporting the lower battery cell; and (c) protruding coupling parts protruding from the upward protruding parts to a predetermined height such that the protruding coupling parts can be coupled to the electrode terminal of the upper battery cell.

Consequently, in a battery pack constructed in a structure in which a plurality of battery cells arranged in the longitudinal direction in series connection to each other are mounted in a pack case, it is possible for the connection member to easily electrically connect electrode terminals of the battery cells in an elastic contact manner.

The terminal connection unit may further comprise a depressed contact part disposed on the central axis of the terminal connection unit such that the depressed contact part is depressed to a predetermined depth from the protruding coupling parts, the depressed contact part contacting the electrode terminal of the upper battery cell.

The shape of the protruding coupling parts is not particularly restricted so long as the protruding coupling parts are easily coupled to the predetermined regions of the electrode terminal of the battery cell. For example, the protruding coupling parts may be constructed in a structure in which two or more bridges connecting the upward protruding parts and the depressed contact part are arranged in a symmetrical fashion, thereby providing a high coupling force through the protruding coupling parts constructed generally in the more elastic structure.

As an example, the protruding coupling parts may be formed approximately in the vertical sectional shape of "∩" to be easily inserted into the predetermined regions of the electrode terminal of the battery cell. In this case, a process for coupling the protruding coupling parts to the predetermined regions of the electrode terminal of the battery cell is more easily carried out. After the coupling between the protruding coupling parts and the predetermined regions of the electrode terminal of the battery cell, the protruding coupling parts do not easily separate from the predetermined regions of the electrode terminal of the battery cell even due to external vibration. According to circumstances, each protruding coupling part may be provided at one side thereof with a coupling protrusion, which protrudes toward the central axis of each terminal connection unit, to further increase the coupling between the protruding coupling parts and the predetermined regions of the electrode terminal of the battery cell.

The coupling protrusion may be constructed in various structures. For example, the coupling protrusion may be constructed in a structure in which the inner end of each protruding coupling part is bent toward the central axis of the connection member, or the coupling protrusion may protrude from the inner side of each protruding coupling part in the shape of a hemispherical protrusion. However, the coupling protrusion is not limited to the above-specified structure.

Since the protruding coupling parts are constructed in a structure in which the plurality of bridges are arranged in the symmetrical fashion, and the protruding coupling parts are formed approximately in the vertical sectional shape of "∩" as previously described, elastic insertion and coupling of the protruding coupling parts are achieved irrespective of the coupling protrusions formed at the sides of the respective protruding coupling parts, at the time of coupling the protruding coupling parts to the predetermined regions of the electrode terminal of the battery cell.

According to circumstances, the connection member may further include auxiliary connection parts extending downward from the ends of the respective upward protruding parts between the respective bridges connecting the upward protruding parts and the depressed contact part. Consequently, as previously described, the elastic force of the upward protruding parts is further increased, and the occurrence of an instantaneous short circuit of the electrode terminal is prevented when an external force, such as vibration or bending, is applied to the battery pack.

In a fifth preferred embodiment, the connection member comprises a terminal connection unit for connecting the battery cells arranged in the longitudinal direction in series to each other, a coupling opening being formed in at least one electrode terminal of the battery cells, the terminal connection unit comprising: (a) an outer circumferential contact part configured to correspond to the external shape of an electrode terminal of a lower battery cell, the outer circumferential contact part contacting the electrode terminal of the lower battery cell at a region adjacent to the outer circumference of the electrode terminal, the outer circumferential contact part having a predetermined width; (b) upward protruding parts tapered upward from the outer circumferential contact part toward a central axis of the terminal connection unit for elastically supporting the lower battery cell; and (c) coupling parts formed on the respective upward protruding parts such that the coupling parts can be elastically coupled into the coupling opening formed in the at least one electrode terminal of the battery cells.

Consequently, the connection member forms the stable connection structure for electrical connection only through the coupling between the connection member and the electrode terminals of the battery cells, and therefore, the change in resistance at the connection regions does not deviate from a desired degree of reliability although external impact is applied to the battery pack. At the same time, it is possible to easily perform a battery pack assembly process and to achieve stable coupling between the electrode terminals of the battery cells.

Also, the coupling opening is formed in the corresponding electrode terminal of the battery cell such that the connection member can be mounted to the corresponding electrode terminal of the battery cell through the coupling opening. Consequently, applicable structures or shapes of the connection member may be further diversified, and the connection member may be constructed in a simpler structure.

For example, the connection member may be constructed in a structure in which the battery cell includes a protruding cathode terminal, and a plurality of gas discharge ports are formed at the protruding parts of the cathode terminal in the circumferential direction of the cathode terminal, and the coupling opening is formed at the central region of the cathode terminal.

The coupling opening, which is configured to be coupled to the connection member, is easily formed at the protruding cathode terminal, and therefore, the coupling opening can be easily applied to a cylindrical battery including such a protruding cathode terminal. Also, the plurality of gas discharge ports, which are arranged about the coupling opening located at the central region of the electrode terminal in the circumferential direction thereof, effectively discharge high-pressure gas in the battery cell, as previously described, thereby securing the safety of the battery cell.

However, the coupling opening is coupled to the connection member in the mechanical coupling manner, with the result that the coupling opening is not completely sealed by the connection member. Consequently, the coupling opening may also function as the gas discharge port. In this structure, no gas discharge port may be formed at the protruding part of the cathode terminal. This structure must be interpreted to be included in the scope of the prevent invention.

The coupling opening may be constructed in various structures or shapes. For example, the coupling opening may be constructed in a cross-shaped structure in which two slits having long and short sides are formed at the central region of the outer circumference of the electrode terminal of the battery cell, on the plane of the electrode terminal of the battery cell, such that the two slits intersect at right angles.

Consequently, it is possible to easily couple battery cells to each other using a connection member including a coupling part formed in a shape corresponding to that of the long side. The coupling part of the connection member is inserted through the long side of the coupling opening, and is then rotated to a position where the coupling part of the connection member becomes parallel to the short side of the coupling opening, thereby achieving the elastic coupling between the connection member and the corresponding battery cell. Consequently, it is possible to simply and easily achieve the coupling between the connection member and the corresponding battery cell and, at the same time, the electrical connection between the connection member and the corresponding battery cell.

As another example, the coupling opening may be constructed in a structure in which two arc-shaped slits are disposed about the central axis of the electrode terminal in a symmetrical fashion.

The coupling parts, of the connection member, horizontally bent in the longitudinal direction of the slits such that the coupling parts are constructed approximately in the vertical sectional shape of "L" are inserted into the two arc-shaped slits disposed in a symmetrical fashion, and are then rotated such that the horizontally bent portions of the "L" shaped coupling parts are elastically connected to the lower end of the electrode terminal having no slits, whereby the stable coupling between the connection member and the battery cell is achieved.

The coupling parts may be bent such that ends of the coupling parts protrude upward. In this structure, the coupling parts can be easily inserted into the coupling opening of the battery cell, thereby achieving the electrical connection between the connection member and the battery cell.

Preferably, the coupling parts extend from the respective upper protruding parts, such that the coupling parts are disposed in a symmetrical fashion, whereby more elastic coupling between the coupling parts and the coupling opening of the corresponding battery cell is achieved.

The upward protruding parts extend from the upper inside and the lower inside of the outer circumferential contact part such that the upward protruding parts are tapered upward from the outer circumferential contact part toward the central axis of the connection member. Consequently, the upward protruding parts can be easily inserted into predetermined regions formed at the electrode terminal of the battery cell, and the outer circumferential contact part can elastically contact the lower battery cell.

The terminal connection unit may further comprise a plurality of auxiliary connection parts tapered downward and/or upward from the inside of the outer circumferential contact part.

In a sixth preferred embodiment, the connection member comprises a terminal connection unit for connecting the battery cells arranged in the longitudinal direction in series to each other, and the terminal connection unit comprises: (a) an outer circumferential contact part configured to correspond to the external shape of an electrode terminal of a battery cell located below the connection member (a lower battery cell), the outer circumferential contact part contacting the electrode terminal of the lower battery cell at a region adjacent to the outer circumference of the electrode terminal, the outer circumferential contact part having a predetermined width; (b) upward protruding parts tapered upward from the outer circumferential contact part toward a central axis of the terminal connection unit for elastically supporting the lower battery cell; and (c) a central contact part contacting an electrode terminal of a battery cell located above the connection member (an upper battery cell), the terminal connection unit being constructed in a structure in which cut-out parts are formed at the upward protruding part and the central contact part, such that the cut-out parts extend from the upward protruding part to the central contact part and successively extend from the central contact part to the upward protruding part, to increase an elastically supporting force with respect to the electrode terminal of the battery cell.

Since the connection member is constructed in a structure in which the cut-out parts are formed at the upward protruding part and the central contact part such that the cut-out parts extend from the upward protruding part to the central contact part and successively extend from the central contact part to the upward protruding part, the elastically supporting force with respect to the electrode terminal of the battery cell is increased, and therefore, the change in resistance at the connection regions does not deviate from a desired degree of reliability although external impact is applied to the battery pack. Furthermore, it is possible to prevent the occurrence of a short circuit of the lower battery cell due to the depression of the electrode terminal of the lower battery cell.

Also, the connection member is elastically connected to the electrode terminals of the battery cells while being somewhat pressed, and the cut-out parts reduce the elasticity of the upward protruding parts, with the result that the upward protruding parts become more flexible. Consequently, the change in resistance at the connection regions does not deviate from a desired degree of reliability although external impact is applied to the battery pack.

Preferably, the central contact part has a contact interface of a size equivalent to 20% to 80% of the surface area of the electrode terminal of the upper battery cell. It is preferred to increase the size of the contact interface for surface contact when considering the resistance at the contact region; however, the increase in size of the central contact part causes the decrease in size of the outer circumferential contact part. Consequently, it is necessary for the contact interface to be within the above-specified range.

For example, the outer circumferential contact part and the central contact part may be electrically connected to the anode terminal and the cathode terminal of the battery cells, respectively, in a physical contact manner. That is, the cathode terminal of one cylindrical battery cell is electrically connected to the central contact part, which is connected to the upward protruding parts of the connection member while the central contact part is surrounded by the upward protruding parts, and the anode terminal of the other cylindrical battery cell is electrically connected to the outer circumferential contact part, which is formed, with a predetermined width, at a region adjacent to the outer circumference of the connection member.

The cut-out parts are characteristic structures that are formed at the upper protruding part and the central contact part to make the upper protruding part flexible. For example, each of the cut-out parts may be constructed in a structure in which a cut-out start point and a cut-out end point form an angle of 20 to 160 degrees under a condition that each of the cut-out parts does not reach the central axis of the connection member. Preferably, the cut-out start point and the cut-out end point form an angle of 90 degrees.

The cut-out parts may be constructed in various structures. For example, the cut-out parts may be constructed in a bridge structure. The bridge-structured cut-out parts can be easily formed at the upper protruding part and the central contact part. Also, the bridge-structured cut-out parts can effectively provide flexibility to the upper protruding part.

According to circumstances, the cut-out parts may be constructed in a structure in which each cut-out part has two or more end points with respect to one cut-out start point. In this structure, several cut-out parts are formed at the upper protruding part, whereby the upper protruding part exhibits greater flexibility.

Preferably, the distance between the central axis of the connection member and the region of each cut-out part where each cut-out part is the nearest to the central axis of the connection member is 10 to 50% of the width of the central contact part. When the distance between the central axis of the connection member and the region of each cut-out part where each cut-out part is the nearest to the central axis of the connection member is too large as compared with the width of the central contact part, the overall size of the cut-out parts decreases, with the result that the flexibility of the upper protruding part greatly decreases. On the other hand, when the distance between the central axis of the connection member and the region of each cut-out part where each cut-out part is the nearest to the central axis of the connection member is too small as compared with the width of the central contact part, the overall elasticity of the connection member excessively decreases, which is not preferred.

Meanwhile, the structure of the cut-out parts is not particularly restricted so long as the cut-out parts are constructed in a structure in which the cut-out parts extend from the upward protruding part to the central contact part and successively extend from the central contact part to the upward protruding part. Preferably, the respective cut-out parts pass through the uppermost portion of the upward protruding part. In this case, the flexibility of the upward protruding part further increases, since respective cut-out parts pass through the uppermost portion of the upward protruding part.

For example, two or more cut-out parts may be radially arranged about the central axis of the connection member in a symmetrical structure. The symmetrically radial cut-out parts are advantageous in that the symmetrically radial cut-out parts can be easily formed at the connection member. Furthermore, since the number of the cut-out parts is two or more, it is possible to control the flexibility of the upward protruding part to a desired degree.

Also, it is preferred to adjust the size of the cut-out parts in consideration of the thickness of the connection member such that the upward protruding part exhibits appropriate flexibility as well as elasticity. For example, the cut-out parts may be cut out with a width equivalent to 50 to 300% of the thickness of the connection member. The widths of the respective cut-out parts are spaces formed at the connection member by cutting out portions of the connection member. The widths of the respective cut-out parts enable the upward protruding part to exhibit appropriate flexibility as well as elasticity while preventing the deformation or the breakage of the upward protruding part.

According to circumstances, the cut-out parts may be formed at the connection member in the shape of a line or slit.

In the first, fourth, fifth, and sixth preferred embodiments of the connection member, among the above-described illustrative examples of the connection member, the connection member may include two or more terminal connection units connected to each other to simultaneously achieve the connection in series between the battery cells arranged in the longitudinal direction and the connection in parallel between battery cells arranged in the lateral direction. Consequently, the connection member may be constructed in a structure that is applicable to a series-connection and parallel-connection type battery pack as well as a series-connection type battery pack.

Also, in the first to sixth preferred embodiments of the connection member, the terminal connection unit may be provided at one side thereof with a circuit connection terminal part. The circuit connection terminal part may be an input and output terminal for power supply, a detection terminal for voltage detection, or a combination thereof. The circuit connection terminal part may be formed in various shapes. For example, circuit connection terminal part may be formed in the shape of a strip extending from the outer circumferential contact part. The strip-shaped circuit connection terminal part may be bent such that the circuit connection terminal part is brought into tight contact with the side of the lower battery cell while the connection member is mounted to the lower battery cell.

In the above-described illustrative examples of the connection member, the width of the outer circumferential contact part contacting the battery cell is preferably 5 to 30% of the radius of the terminal connection unit. When the contact width of the outer circumferential contact part is less than 5%, the resistance at the contact region increases due to the small contact area. Also, the electrode terminal of the battery cell becomes out of position due to external impact, with the result that the electrical connection may be easily cut off. On the other hand, when the contact width of the outer circumferential contact part exceeds 30%, the sizes of the remaining parts, including the upward protruding parts, decrease, with the result that it is difficult to provide a predetermined elastic force, and it is difficult to couple the protruding coupling parts to the corresponding regions of the battery cell.

Also, the respective upward protruding parts preferably have a width equivalent to 20 to 60% of the radius of the terminal connection unit and a tilt angle of 5 to 30 degrees. When the width of the respective upward protruding parts is less than 20% of the radius of the terminal connection unit, it is difficult to provide a predetermined elastic force, as previously described. On the other hand, when the width of the respective upward protruding parts exceeds 60% of the radius of the terminal connection unit, the areas of the contact parts contacting the electrode terminals of the battery cells are relatively reduced, with the result that a desired electrical connection is not achieved. Also, when the tilt angle of the respective upward protruding parts is less than 5 degrees to the lower end of the terminal connection unit, i.e., the outer circumferential contact part, it is difficult to provide a predetermined elastic force against external impact. On the other hand, when the tilt angle of the respective upward protruding parts exceeds 30 degrees, the inner space of the battery pack is reduced, and the respective upward protruding parts may break when external pressure is applied to the respective upward protruding parts.

Also, the protruding coupling parts (or the coupling parts) preferably have a height equivalent to 30 to 70% of the total height of the connection member. When the height of the protruding coupling parts is less than 30%, which means that the size of the protruding regions is small, it is difficult to couple the protruding coupling parts to predetermined regions of the electrode terminal of the battery cell. On the other hand, when the height of the protruding coupling parts exceeds 70%, it is required to further increase the inner space of the battery pack, whereby the size of the battery pack increases.

Also, the auxiliary connection parts are preferably inclined upward or downward at an angle of 20 to 70 degrees to the horizontal section of the connection member. When the auxiliary connection parts are inclined at an angle of less than 20 degrees, it is difficult for the auxiliary connection parts to maintain their elasticity when the auxiliary connection parts come into contact with the electrode terminal of the battery cell. On the other hand, when the auxiliary connection parts are inclined at an angle of more than 70 degrees, the auxiliary connection parts may damage, for example scratch, the electrode terminal, or the auxiliary connection parts may break during the assembly or the use of the battery pack.

In a preferred embodiment, the connection member is characterized in that the outer circumferential contact part is further provided at the outer circumference thereof with one or more downward extensions constructed in a structure to partially cover the upper-end side of the lower battery cell. As previously described, the downward extensions may be constructed in a variable skirt structure or in a non-variable skirt structure.

Since the downward extensions are constructed in a structure to partially cover the upper-end side of the lower battery cell, it is possible to prevent the connection member from deviating in position from the lower battery cell due to external impact, and therefore, a more stable connection is achieved.

Preferably, the one or more downward extensions are arranged along the outer circumference of the outer circumferential contact part in a symmetrical structure. Consequently, the prevention of the connection member from deviating in position from the lower battery cell and the stable connection is more effectively achieved.

The length of the downward extensions is not particularly restricted so long as the downward extensions are constructed in a structure to provide the above-mentioned effects. For example, the downward extensions may have a length equivalent to 20 to 150% of the total height of the connection member.

Meanwhile, the connection member, which is constructed in various structures as previously described, may be manufactured in a single body by pressing a conductive sheet. Specifically, the conductive sheet is punched or rolled according to the shape of the connection member, and therefore, it is possible to easily and simply manufacture the connection member having a specific structure.

Preferably, the connection member is used especially for cylindrical battery cells. In this case, the specific regions of the connection member are generally constructed in a concentric circle structure, which corresponds to the shape of the electrode terminal of each cylindrical battery cell, with the result that the contact area therebetween is maximized.

In accordance with another aspect of the present invention, there is provided a battery pack constructed in a structure in which the connection member is mounted between electrode terminals of battery cells to achieve the electrical connection between the battery cells.

The battery pack may be constructed in a structure in which a plurality of battery cells are electrically connected to one another in rows in a pack case. The number of the rows may be one or more.

The connection member may be used to electrically connect the battery cells arranged in the longitudinal direction in each row. In a structure including two or more battery rows, the connection member may be used to electrically connect the battery cells (bank) arranged in the lateral direction.

When the connection member is used only for the electrical connection of the bank, for example, the battery pack may be manufactured in a structure in which battery cells are mounted in a pack case including receiving parts constructed such that two or more secondary battery cells are mounted in the respective receiving parts while being adjacent to each other in the lateral direction, and the connection member is coupled to a sidewall contacting electrode terminals of the battery cells, among sidewalls constituting the pack case, such that the outer circumferential contact parts of the connection member is directed toward the electrode terminals of the battery cells.

The battery pack according to the present invention may be used as, but is not limited to, a power source for household electric appliances, such as portable DVD players, small-sized PCs, etc., requiring high power and large capacity.

More preferably, the battery pack according to the present invention is used as a power source for laptop computers. In accordance with a further aspect of the present invention, therefore, there is provided a laptop computer including the battery pack as a power source.

The general structure of the laptop computers and a method of manufacturing the same are well known in the art to which the present invention pertains, and therefore, a further description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
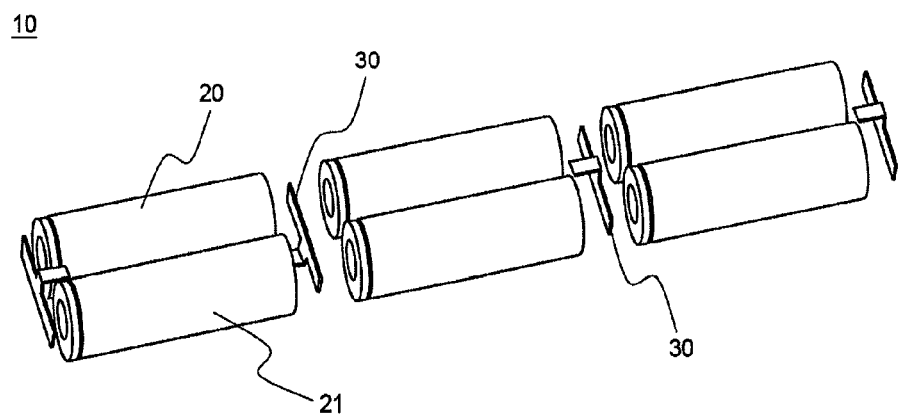
FIG. 1 is an exploded view illustrating the coupling between batteries electrically connected to each other by conventional connection members, such as metal plates.
Figure 2:
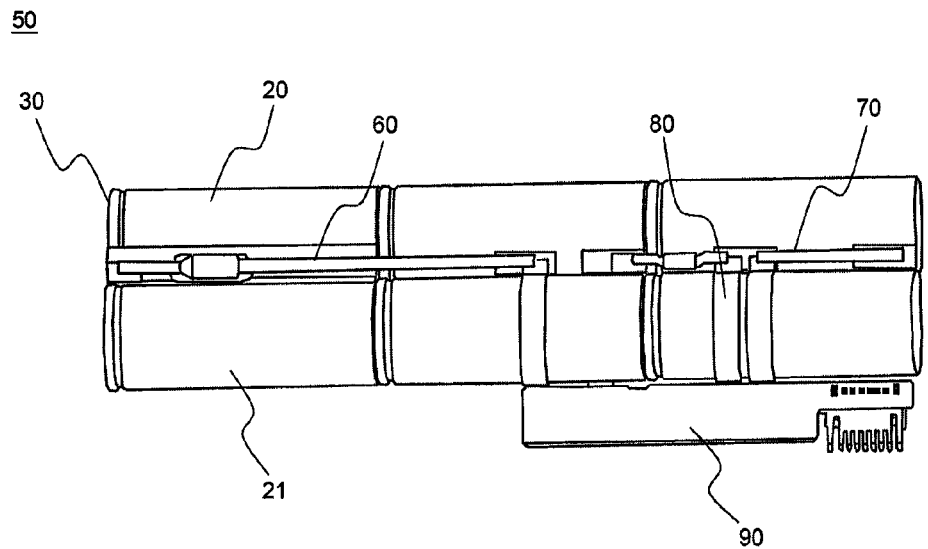
FIG. 2 is a typical view illustrating a battery module in which a protection circuit module is connected to a core pack of FIG. 1.
Figure 3:
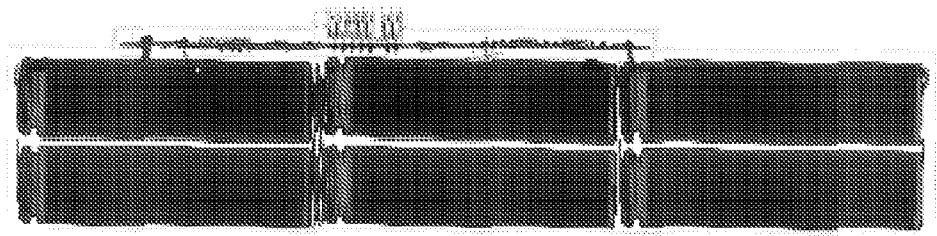
FIG. 3 is an X-ray fluoroscopic view illustrating a battery pack constructed in a structure in which the battery module of FIG. 2 is mounted in a pack case.
Figure 4:
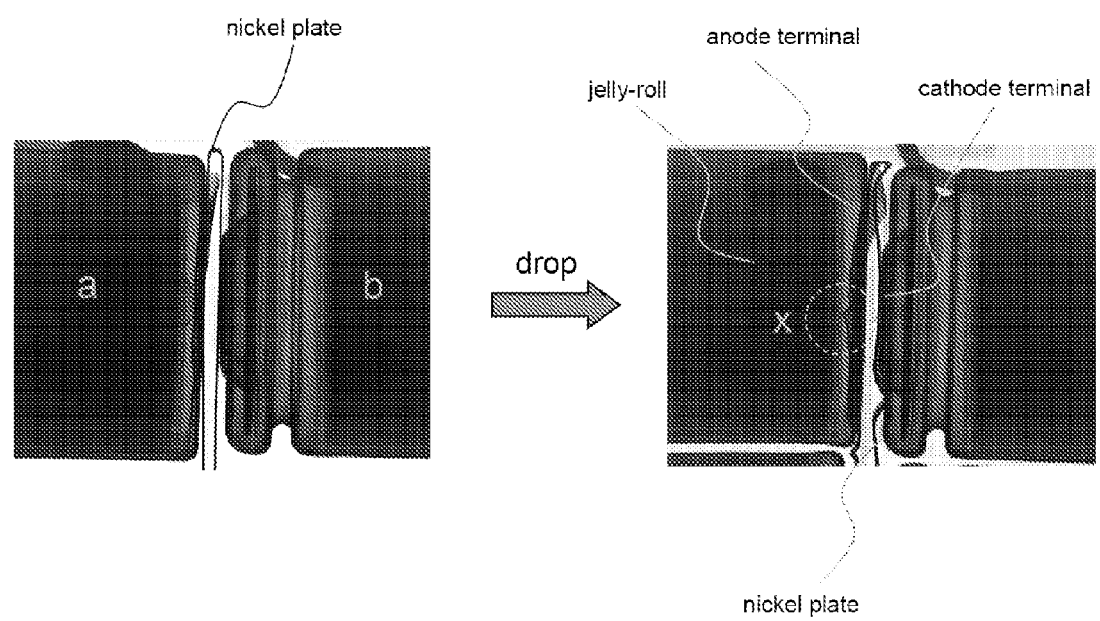
FIGS. 4 and 5 are X-ray fluoroscopic views respectively illustrating the change of the battery pack of FIG. 3 and a battery pack constructed by using a connection member according to a preferred embodiment of the present invention, after dropping the battery packs.
Figure 5:
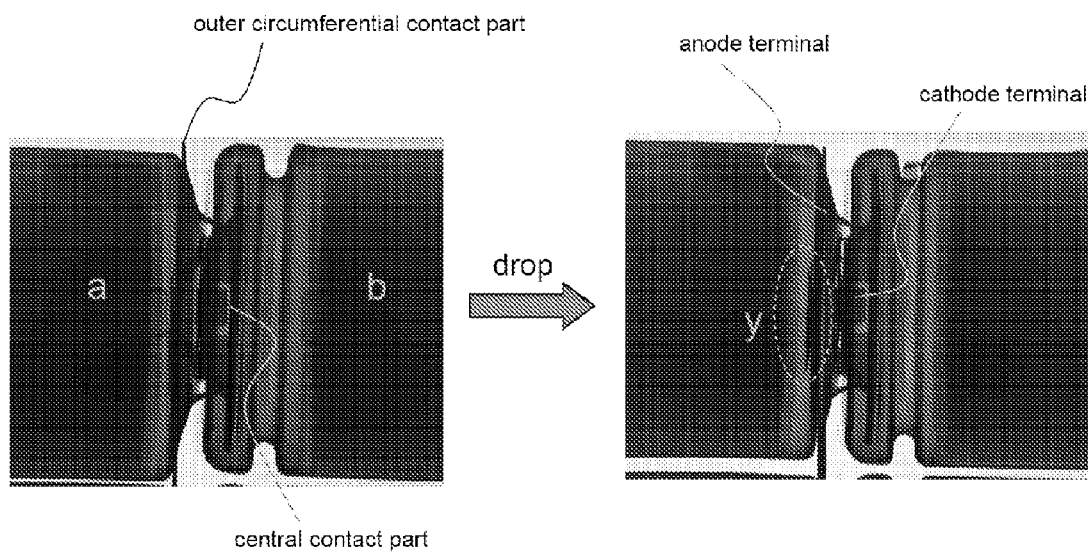
Figure 6:
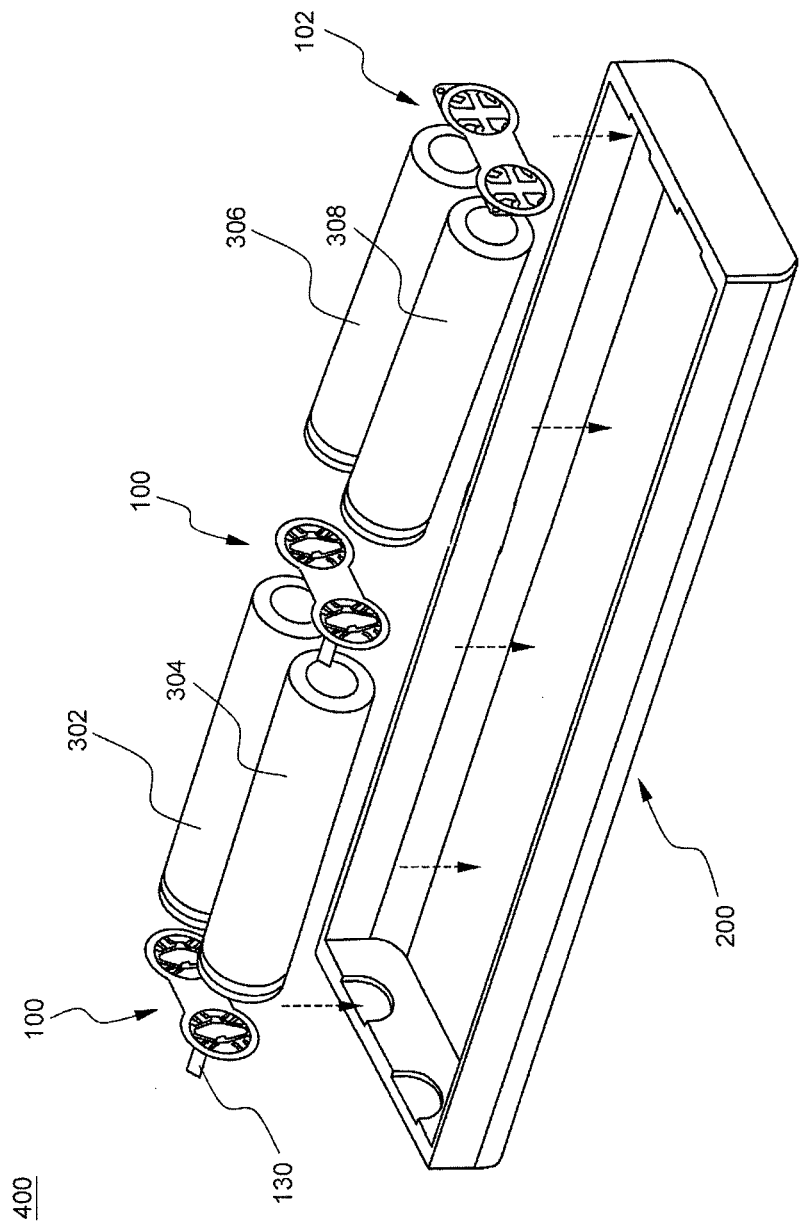
FIGS. 6 and 7 are perspective views typically illustrating a process for assembling a battery pack according to a preferred embodiment of the present invention.
Figure 7:
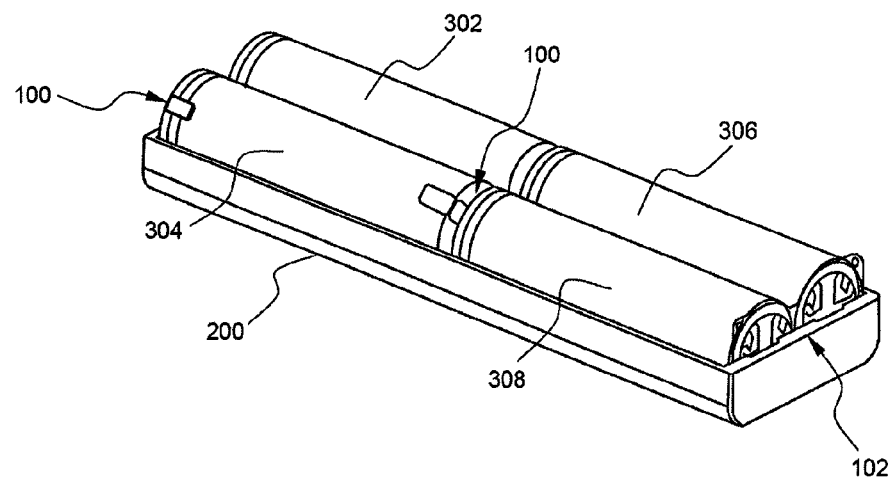

FIGS. 6 and 7 are perspective views typically illustrating a process for assembling a battery pack according to a preferred embodiment of the present invention.

Referring to these drawings, the battery pack 400 is constructed in a structure in which a plurality of cylindrical battery cells 302, 304, 306, and 308 are electrically connected to one another via predetermined connection members 100 and 102 in a pack case 200 having no partition.

Specifically, two kinds of connection members 100 and 102 and four cylindrical battery cells 302, 304, 306, and 308 are located in a receiving part of the pack case 200, while the four cylindrical battery cells 302, 304, 306, and 308 are brought into tight contact with one another, such that cathode terminals are connected to protruding coupling parts 130 of the connection members 100 in a mechanical coupling manner.

Consequently, the cathode terminals of the cylindrical battery cells 306 and 308 are connected to the connection members 100 having the protruding coupling parts 130 in a mechanical coupling manner, while the cathode terminals of the cylindrical battery cells 306 and 308 are elastically pressed, and anode terminals of the cylindrical battery cells 302 and 304 are connected to the connection members 100 in a physical connection manner, whereby it is possible to easily assemble the battery pack and stably maintain the connection structure between the electrode terminals of the battery cells.

Also, the connection member 102, which includes no protruding coupling part 130, is mounted at the region where anode terminals of the cylindrical battery cells 306 and 308 come into contact with a sidewall of the pack case, whereby the anode terminals of the cylindrical battery cells 306 and 308, arranged in the lateral direction, are electrically connected in parallel to each other.

The structure of the battery pack 400 after the assembly is shown in FIG. 7. Referring to FIG. 7, the battery pack 400 is constructed in a 2P-2S plane-type structure in which the two cylindrical battery cells 300 are arranged in contact with each other in the lateral direction, and, at the same time, the two cylindrical battery cells 300 are arranged in the longitudinal direction.

Figure 8:
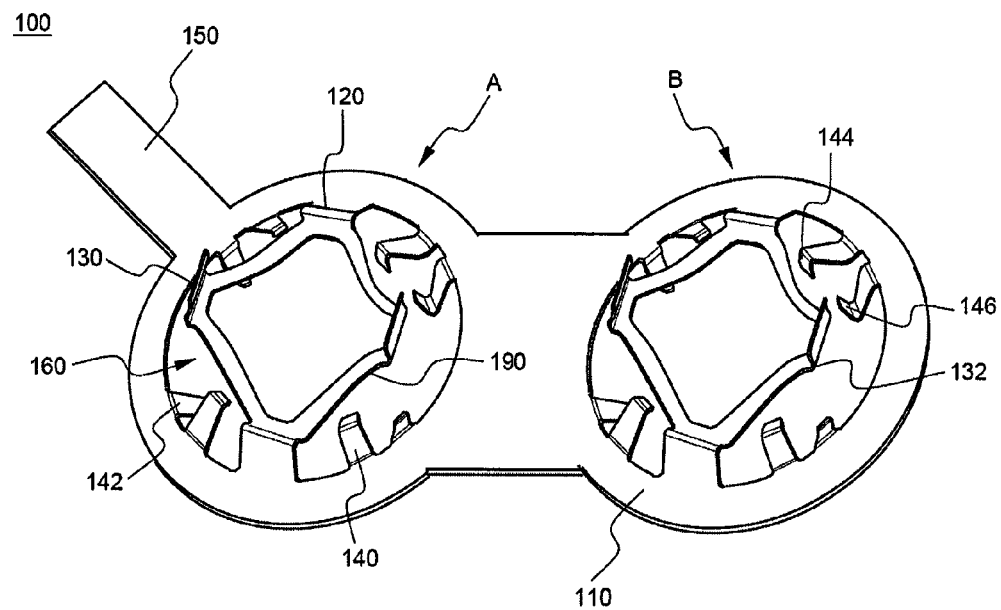
FIG. 8 is an enlarged perspective view illustrating a connection member used in FIG. 6.
Figure 9:
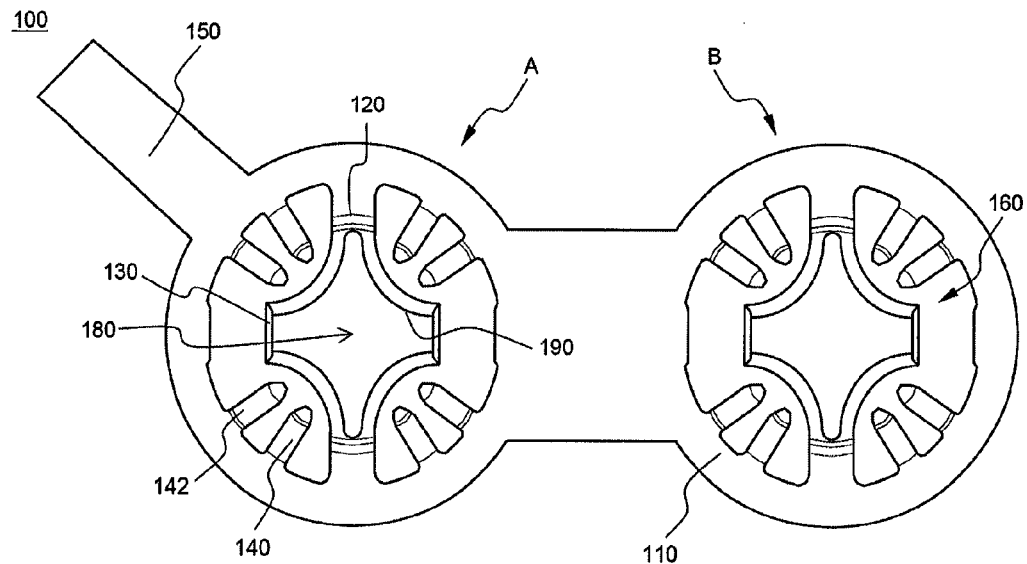
FIG. 9 is a typical plan view of the connection member used in FIG. 6.

FIG. 8 is an enlarged perspective view illustrating the connection member 100 used in FIG. 6, and FIG. 9 is a typical plan view of the connection member used in FIG. 6.

Referring to these drawings, the connection member 100 is constructed in a structure in which two terminal connection units A and B are connected to each other, and a circuit connection terminal part 150 for connection to an external circuit is included in the connection member 100.

Each of the terminal connection units includes an outer circumferential contact part 110, having a predetermined width, electrically connected to an electrode terminal of a lower battery cell (not shown) in a surface contact manner, a bridge-type central contact part 160, and auxiliary connection parts 140 and 142 tapered upward and downward, respectively, from the inside of the outer circumferential contact part 110.

The central contact part 160 includes upward protruding parts 120 extending from the outer circumferential contact part 110 toward a central axis 180 of each terminal connection unit, such that the upward protruding parts 120 are tapered upward, and protruding coupling parts 130 connected to the respective upward protruding parts 120 via bridges 190 while protruding upward.

The outer circumferential contact part 110 is electrically connected to the electrode terminal (not shown) of the lower battery cell in a surface contact manner, while contacting the electrode terminal of the lower battery cell along the outer circumference of the electrode terminal of the lower battery cell, to minimize the change of resistance at the contact region against an external force and restrain a possibility that the electrode terminal of the lower battery cell is depressed. The outer circumferential contact part 110 is constructed in a ring-shaped structure corresponding to the shape of the electrode terminal of the lower battery cell such that the outer circumferential contact part 110 can contact the electrode terminal of the lower battery cell in a surface contact manner.

The central contact part 160 protrudes such that the central contact part 160 can be located higher than the outer circumferential contact part 110. The central contact part 160 is constructed in an elastic bridge structure to exhibit high contact elasticity and to disperse external impact when the external impact is applied to the central contact part 160, thereby minimizing the amount of the impact transmitted to the outer circumferential contact part 110.

The top of each upward protruding part 120 protrudes upward in the vertical sectional shape thereof. Also, each protruding coupling part 130 is provided at the inside thereof with a coupling protrusion 132, which protrudes toward the central axis 180 of the terminal connection unit. The coupling protrusion 132 of each protruding coupling part 130 prevents the connection member from separating from the upper battery cell (not shown) after the connection member is coupled to a predetermined region of the electrode terminal of the upper battery cell. At this time, the upward protruding parts 120 and the bridges 190 contact the central region of the electrode terminal of the upper battery cell, whereby the electrical connection is achieved.

The four bridges 190 connecting the protruding coupling parts 130 and the upward protruding parts 120 are radially arranged in a symmetrical structure. Specifically, the bridges 190, arranged at predetermined intervals, connect the upward protruding parts 120 and the protruding coupling parts 130. The bridges 190 protrude upward.

Also, the four auxiliary connection parts 140 are tapered upward from the outer circumferential contact part 110 in a space defined between the respective bridges 190 and the outer circumferential contact part 110. The other four auxiliary connection parts 142 are tapered downward from the outer circumferential contact part 110. Ends of the respective auxiliary connection parts 140 are bent downward, i.e., in the direction opposite to the upward taper direction of the corresponding auxiliary connection parts, and ends of the respective auxiliary connection parts 142 are bent upward, i.e., in the direction opposite to the downward taper direction of the corresponding auxiliary connection parts. Consequently, when the connection member 100 is mounted to the cathode or anode terminals of the lower battery cell (not shown), the auxiliary connection parts 140 and 142 are connected to the electrode terminals of the lower battery cells or the upper battery cells while being elastically pressed.

Although the auxiliary connection parts 140 and 142 exhibit somewhat low modulus of elasticity, the four auxiliary connection parts 140 and the four auxiliary connection parts 142 are independently connected to the electrode terminal of the battery cell. Consequently, the auxiliary connection parts 140 and 142 prevent the occurrence of an instantaneous short circuit of the battery cell due to an external factor, such as vibration, thereby continuously maintaining the electrical connection between the battery cells.

Figure 10:
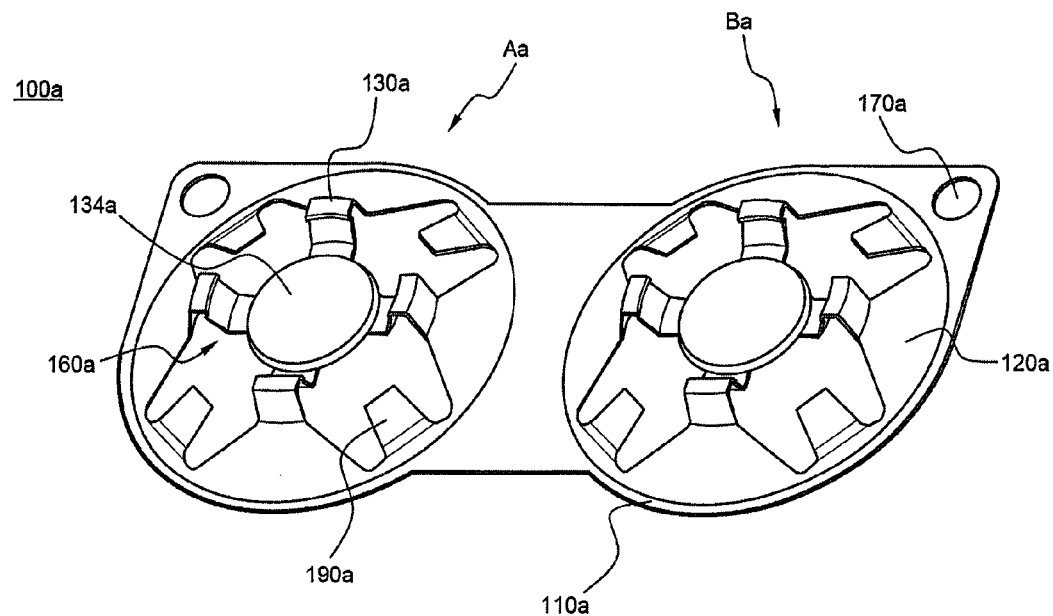
FIG. 10 is a perspective view illustrating a connection member according to another preferred embodiment of the present invention.
Figure 11:
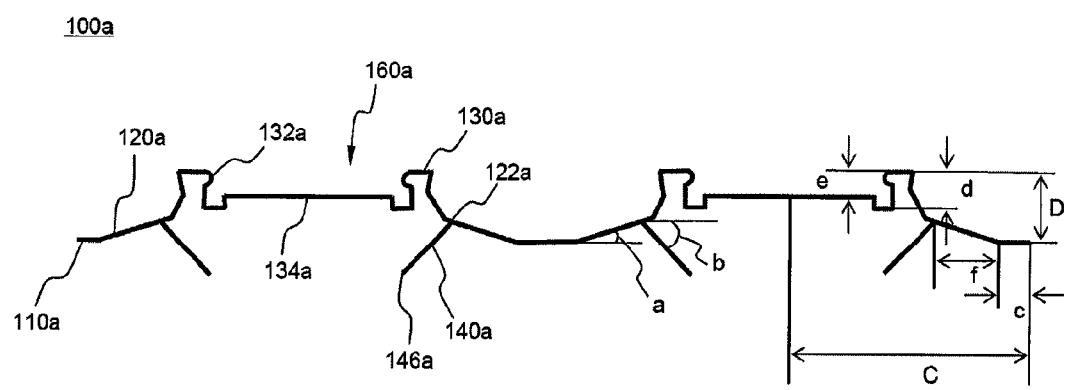
FIG. 11 is a vertical sectional view of the connection member shown in FIG. 10.
Figure 12:
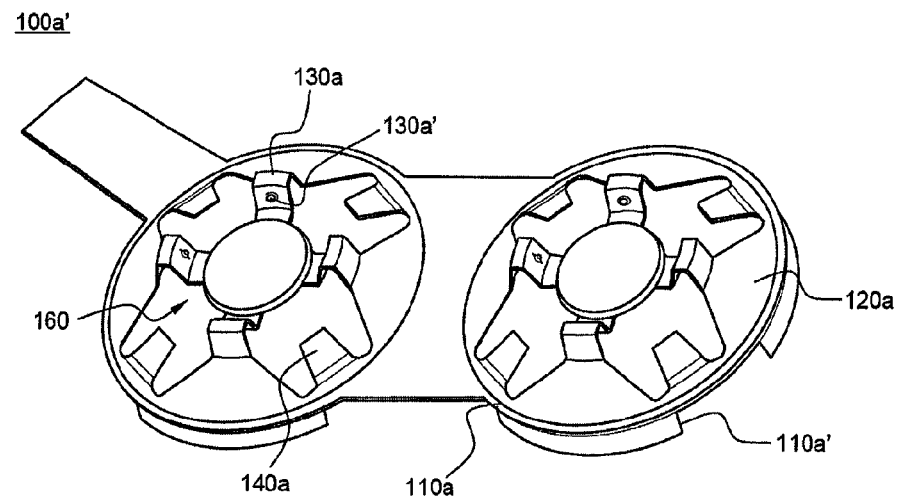
FIG. 12 is a perspective view illustrating a connection member according to a modification.

FIG. 10 is a perspective view illustrating a connection member according to another preferred embodiment of the present invention, FIG. 11 is a vertical sectional view of the connection member shown in FIG. 10, and FIG. 12 is a perspective view illustrating a connection member according to a modification.

Referring to these drawings, the connection member 100a includes two terminal connection units Aa and Ba connected to each other and circuit connection terminal parts 170a for connection to an external circuit.

Each of the terminal connection units includes an outer circumferential contact part 110a electrically connected to an electrode terminal of a lower battery cell (not shown) in a surface contact manner, the outer circumferential contact part 110a having a predetermined width c, a central contact part 160a protruding from the outer circumferential contact part 110a toward a central axis 180 of each terminal connection unit, and auxiliary connection parts 140 and 142 protruding from the inside end of the outer circumferential contact part 110a.

The central contact part 160a includes upward protruding parts 120a configured to be tapered upward, protruding coupling parts 130a protruding upward from the respective upward protruding parts 120a to a predetermined height d, and a depressed contact part 134a disposed on the central axis 180a of each terminal connection unit such that the depressed contact part 134a is depressed to a predetermined depth e from upper end surfaces of the respective protruding coupling parts 130a, the depressed contact part 134a being electrically connected to an electrode terminal of an upper battery cell (not shown).

The outer circumferential contact part 110a is formed in the shape of a concentric circle corresponding to the outside of the electrode terminal of the lower battery cell.

The respective upward protruding parts 120a have a width f equivalent to approximately 30% of the radius C of each terminal connection unit. The respective upward protruding parts 120a are tapered upward at a predetermined angle a toward the central axis 180a of each terminal connection unit from the outer circumferential contact part 110a. Consequently, the elastic connection between the outer circumferential contact part 110a and the electrode terminal of the lower battery cell is maintained by the upward protruding parts 120a.

The height d of the respective protruding coupling parts 130a is approximately 50% of the total height D of the connection member 100a. The respective protruding coupling parts 130a are formed approximately in the vertical sectional shape of "∩." Also, each protruding coupling part 130a is provided at the inside thereof with a coupling protrusion 132a, which protrudes toward the central axis 180a of each terminal connection unit. Consequently, the protruding coupling parts 130a prevent the connection member from separating from the upper battery cell after the connection member is coupled to a predetermined region of the electrode terminal of the upper battery cell. At this time, the depressed contact part 134a contacts the central region of the electrode terminal of the upper battery cell, whereby the electrical connection is achieved.

The protruding coupling parts 130a are constructed in a structure in which four bridges 190a connecting the respective upward protruding parts 120a and the depressed contact part 134a are radially arranged in a symmetrical fashion. Specifically, the bridges 190a, arranged at predetermined intervals, connect the respective upward protruding parts 120*a* and the depressed contact part 134*a*. The bridges 190*a* protrude upward to constitute the respective protruding coupling parts 330.

The auxiliary connection parts 140*a* are inclined at a predetermined angle b toward the central axis 180*a* of each terminal connection unit. Lower ends 144*a* of the respective auxiliary connection parts 140*a* extend to a height lower than that of the outer circumferential contact part 110*a*. Consequently, when the connection member 100*a* is mounted to the anode terminal of the lower battery cell (not shown), the auxiliary connection parts 140*a* are connected to the electrode terminal of the lower battery cell while being elastically pressed.

A connection member 100*a*' of FIG. 12 is different from the connection member 100*a* of FIG. 10 in that a circuit connection terminal part is formed in the shape of a strip extending from one of the outer circumferential contact parts 110*a*, two or more downward extensions 110*a*' are formed at the outer circumference of each outer circumferential contact part 110*a* to partially cover the upper-end sides of lower battery cells, and coupling protrusions 130*a*' protrude from the inner sides of the protruding coupling parts 130*a* in the shape of a hemispherical protrusion.

The downward extensions 110*a*' are constructed in a structure to partially cover the upper-end sides of the lower battery cells. Consequently, the downward extensions 312 prevent the connection member 100*a*' from deviating in position from the lower battery cells due to external impact and maintain the secure coupling between the connection member 100*a*' and the lower battery cells.

This structure enables the connection member to be connected to the upper battery cells and the lower battery cells in a coupling fashion. That is, the protruding coupling parts of the connection member are coupled to the electrode terminals of the upper battery cells, and the downward extensions of the connection member are coupled to the electrode terminals of the lower battery cells. Consequently, the connection member is coupled to both the upper and lower battery cells.

Figure 13:
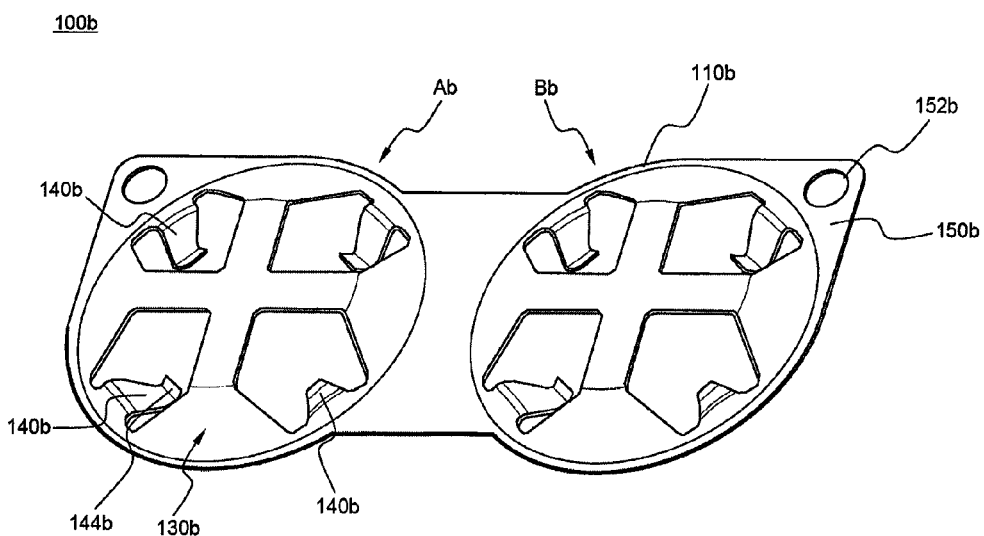
FIG. 13 is an enlarged perspective view illustrating an example of a connection member used in FIG. 6.
Figure 14:
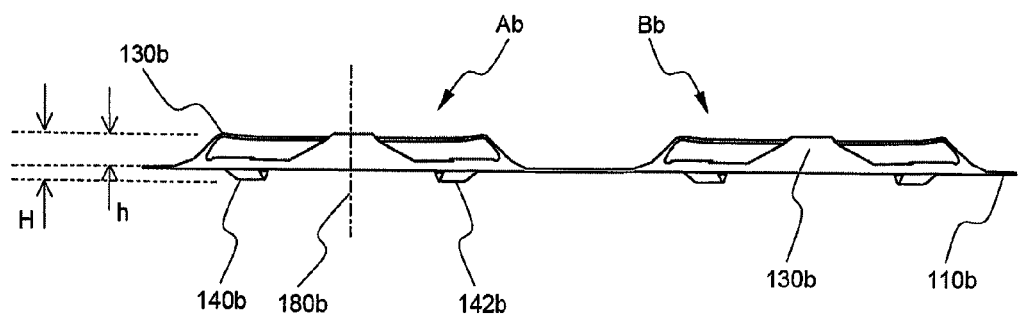
FIG. 14 is a typical plan view of the example of the connection member used in FIG. 6.

FIG. 13 is an enlarged perspective view illustrating an example of the connection member 102 used in FIG. 6, and FIG. 14 is a typical plan view of the example of the connection member used in FIG. 6.

Referring to these drawings, the connection member 100*b* is constructed in a structure in which two terminal connection units Ab and Bb are connected to each other, and the connection member is provided at one side thereof with a side extension part 150*b* where a circuit connection terminal part 152*b* for connection to an external circuit is located.

Each of the terminal connection units includes an outer circumferential contact part 110*b*, having a predetermined width, electrically connected to an electrode terminal of a lower battery cell (not shown) in a surface contact manner, a bridge-type central contact part 130*b* extending from the outer circumferential contact part 110*b* toward a central axis 180*b* of each terminal connection unit such that the central contact part 130*b* is tapered upward, and auxiliary connection parts 140*b* tapered downward from the inside of the outer circumferential contact part 110*b*.

The central contact part 130*b* has a predetermined height h less than the total height H of the connection member 100*b*. The four bridges of the central contact part 130*b* are symmetrically arranged in a cross-shaped structure.

Also, the four auxiliary connection parts 140*b*, which are arranged radially about the central axis 180*b* of each terminal connection unit in a symmetrical structure, are tapered downward from the outer circumferential contact part 110*b* in a space defined between the central contact part 130*b* and the outer circumferential contact part 110*b*. Ends 144*b* of the respective auxiliary connection parts 140*b* are bent upward, i.e., in the direction opposite to the downward taper direction of the corresponding auxiliary connection parts. Consequently, when the connection member 100*b* is mounted to the anode terminals of the lower battery cells (not shown), the auxiliary connection parts 140*b* are connected to the electrode terminals of the battery cells located below the connection member 100*b* while being elastically pressed.

Figure 15:
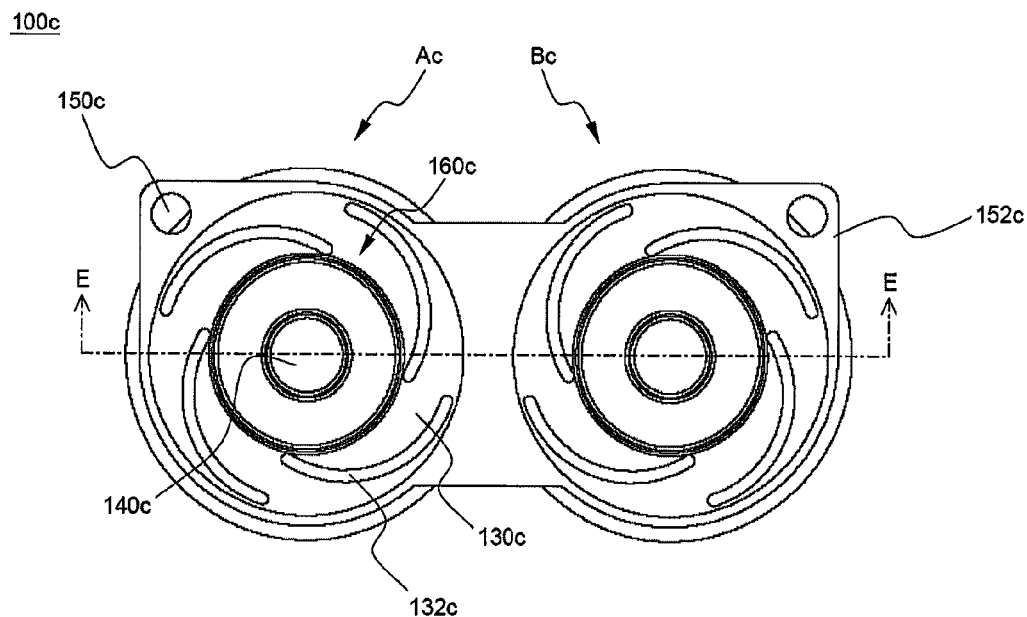
FIG. 15 is a typical plan view illustrating a connection member according to another preferred embodiment of the present invention.
Figure 16:
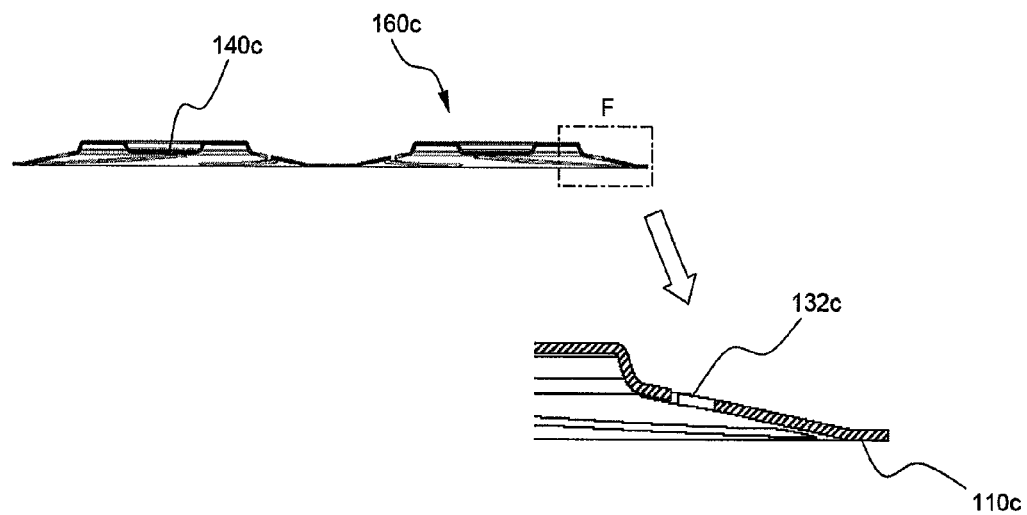
FIG. 16 is a vertical sectional view taken along line E-E of FIG. 15 with an enlarged view of a part F.

FIG. 15 is a typical plan view illustrating a connection member according to another preferred embodiment of the present invention, and FIG. 16 is a vertical sectional view taken along line E-E of FIG. 15 with an enlarged view of a part F.

Referring to these drawings, the connection member 100*c* is a single metal plate constructed in a 2P structure in which two terminal connection units Ac and Bc are connected to each other. Each of the terminal connection units is constructed in a dish-shaped disc structure. Each of the terminal connection units includes an outer circumferential contact part 110*c* and a central contact part 160*c*, which form a concentric circle structure.

The outer circumferential contact part 110*c* corresponds to the circular outside of a battery cell terminal (not shown) such that the outer circumferential contact part 110*c* contacts the battery cell terminal at the outer circumference thereof.

The central contact part 160*c* includes a pressing part 130*c* tapered at a predetermined inclination toward a central axis of each terminal connection unit to provide an elastic force and a depressed part 140*c* formed at the central part of the pressing part 130*c*. At each side extension part 152*c* of the connection member 100*c* is located a circuit connection terminal part 150*c* for connection to an external circuit.

A battery cell is elastically connected to the central contact part 160*c*, which has the predetermined inclination. At the pressing part 130*c* of the central contact part 160*c* are formed cut-off parts 132*c* arranged about the central axis of each terminal connection unit in the shape of a whirlpool. Consequently, it is possible to control the elastic force of the central contact part 160*c* to a desired degree.

Figure 17:
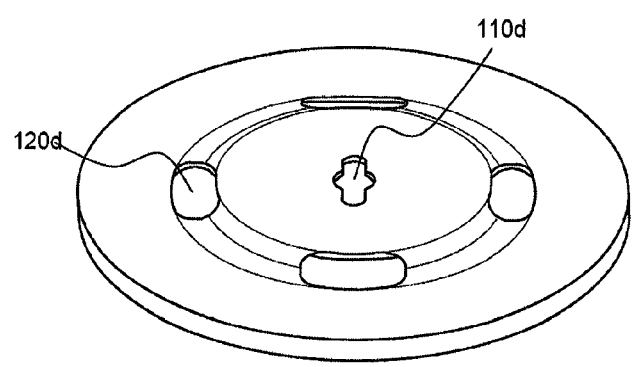
FIGS. 17 and 18 are perspective views respectively illustrating electrode terminals having coupling openings according to other embodiments of the present invention.
Figure 18:
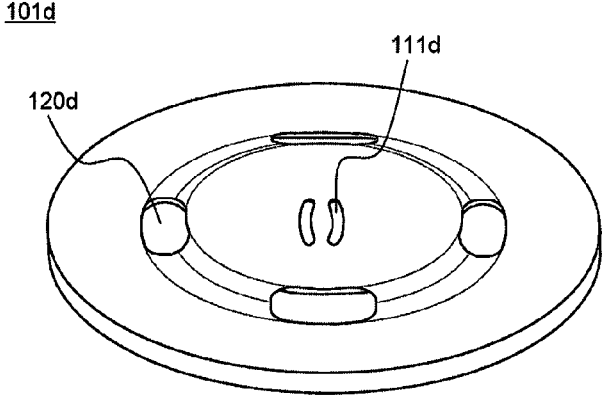

FIGS. 17 and 18 are perspective views respectively illustrating electrode terminals having coupling openings according to other embodiments of the present invention.

Referring to these drawings, the electrode terminal 100*d*; 101*d* according to the present invention has gas discharge ports 120*d* formed at a protrusion thereof in the circumferential direction. The electrode terminal 100*d*; 101*d* is provided at the central region thereof with a coupling opening 110*d*; 111*d* in which an electrical connection member is coupled in a mechanical coupling manner. However, when the coupling opening 110*d*; 111*d* also functions as a gas discharge port, it is not necessary to additionally form the gas discharge ports 120*d*.

The coupling opening 110*d* is formed, for example, approximately in a cross-shaped structure (see the structure of the electrode terminal 100*d*), and the coupling opening 111*d* is formed, for example, in a structure in which two arc-shaped slits are disposed in a symmetrical fashion (see the structure of the electrode terminal 101*d*). Consequently, the electrical connection member and the coupling parts thereof may be formed in various structures depending upon the structure or the shape of the coupling opening 110*d*; 111*d* of the electrode terminal.

Specifically, coupling parts formed in a shape corresponding to the shape of a long side of the cross-shaped coupling opening 110*d* are inserted into the coupling opening 110*s* of the electrode terminal, and are then rotated 90 degrees, whereby the elastic coupling between the electrical connection member and the electrode terminal 100d is achieved.

On the other hand, coupling parts horizontally bent in the longitudinal direction of the slits such that the coupling parts are constructed approximately in the vertical sectional shape of "L" are inserted into the coupling opening 111d constructed in a structure in which the two arc-shaped slits are disposed in a symmetrical fashion, and are then rotated in the direction in which the coupling parts are bent, whereby the elastic coupling between the electrical connection member and the electrode terminal is achieved.

Figure 19:
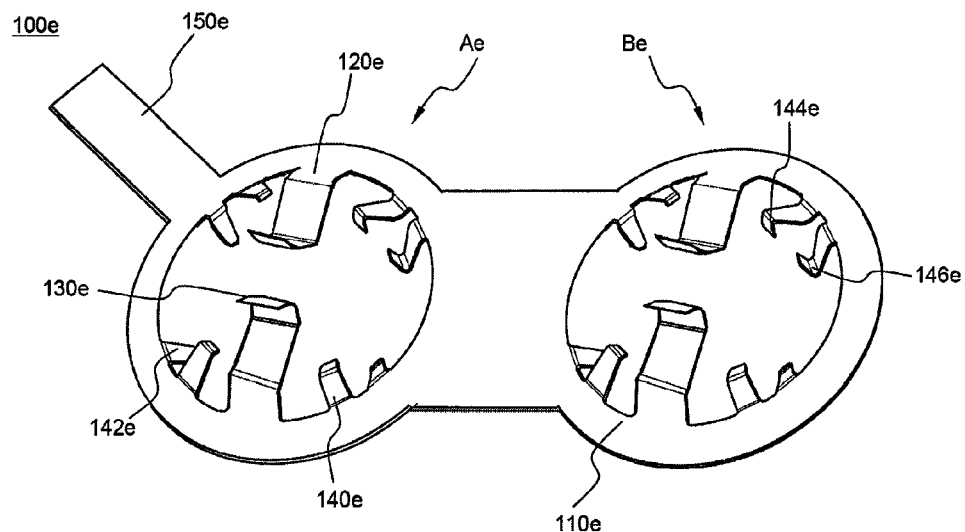
FIGS. 19 and 20 are perspective views respectively illustrating connection members according to other preferred embodiments of the present invention.
Figure 20:
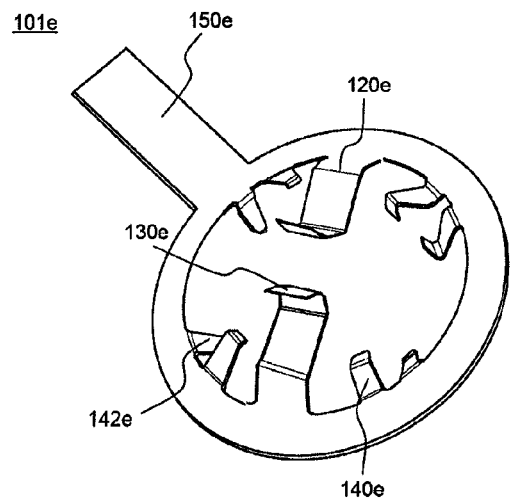

FIGS. 19 and 20 are perspective views respectively illustrating connection members according to other preferred embodiments of the present invention.

Referring first to FIG. 19, the connection member 100e according to the present invention is constructed in a structure in which two terminal connection units Ae and Be are connected to each other, and a circuit connection terminal part 150e for connection to an external circuit is included in the connection member 100e.

Each of the terminal connection units Ae and Be includes an outer circumferential contact part 110e, having a predetermined width, electrically connected to an electrode terminal of a lower battery cell (not shown), coupling parts 130e formed on upward protruding parts 120e tapered upward from the outer circumferential contact part 110e toward a central axis of each terminal connection unit, and auxiliary connection parts 140e and 142e tapered upward and downward, respectively, from the inside of the outer circumferential contact part 110e.

The width of the outer circumferential contact part 110e contacting the electrode terminal of the lower battery cell is approximately 10% of the radius of each terminal connection unit. The outer circumferential contact part 110e is formed in the shape of a concentric circle corresponding to the outside of the electrode terminal of the lower battery cell.

The coupling parts 130e are constructed in a structure in which ends of the respective coupling parts 130e are bent outward. Consequently, when the coupling parts 130e are inserted into the coupling opening 110d of the electrode terminal 100d as shown in FIG. 17 and are then rotated, the electrical connection between the connection member and the electrode terminal is achieved while the coupling between the connection member and the electrode terminal is securely maintained.

Also, the four auxiliary connection parts 140e are inclined upward from the outer circumferential contact part 110e by a predetermined height, and the other four auxiliary connection parts 142e are tapered downward from the outer circumferential contact part 110e by a predetermined depth. Ends of the respective auxiliary connection parts 140e are bent downward, i.e., in the direction opposite to the upward taper direction of the corresponding auxiliary connection parts, and ends of the respective auxiliary connection parts 142e are bent upward, i.e., in the direction opposite to the downward taper direction of the corresponding auxiliary connection parts. Consequently, when the connection member 100e is mounted to the cathode or anode terminals of the lower battery cell (not shown), the auxiliary connection parts 140e and 142e are connected to the electrode terminals of the lower battery cells or the upper battery cells while being elastically pressed.

Although the auxiliary connection parts 140e and 142e exhibit somewhat low modulus of elasticity, the four auxiliary connection parts 140e and the four auxiliary connection parts 142e are independently connected to the electrode terminal of the lower battery cell. Consequently, the auxiliary connection parts 140e and 142e prevent the occurrence of an instantaneous short circuit of the battery cell due to an external factor, such as vibration, thereby continuously maintaining the electrical connection between the battery cells.

The connection member 101e of FIG. 20 is identical in construction to the connection member of FIG. 19 except that the connection member 101e of FIG. 20 includes a single terminal connection unit. That is, the terminal connection unit of the connection member 101e of FIG. 20 includes an outer circumferential contact part 110e, upward protruding parts 120e, protruding coupling parts 130e and 132e, and auxiliary connection parts 140e and 142e, and a circuit connection terminal part 150e, all of which are identical to those of FIG. 19. Accordingly, a detailed description of the same components will not be given.

Figure 21:
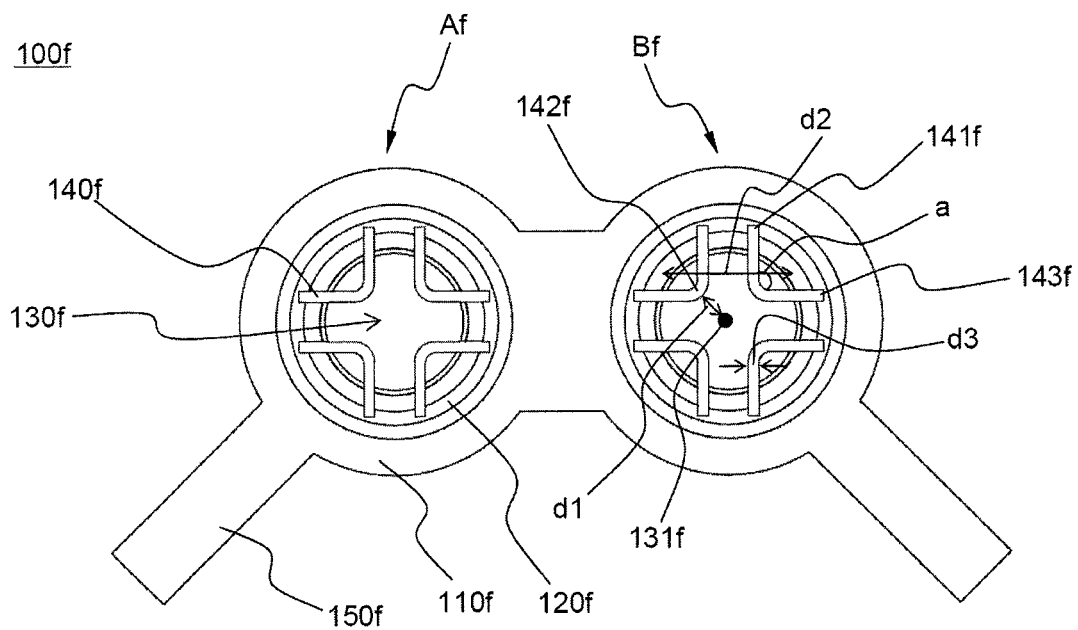
FIG. 21 is a plan view typically illustrating a connection member according to another preferred embodiment of the present invention.
Figure 22:
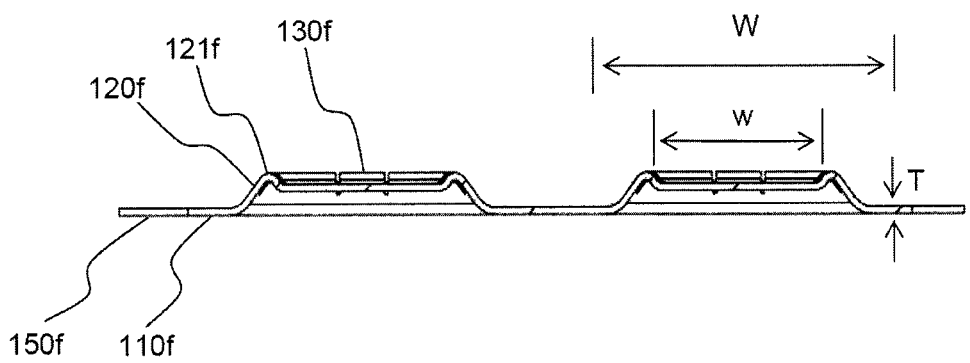
FIG. 22 is a typical sectional view of the connection member shown in FIG. 21.

FIG. 21 is a plan view typically illustrating a connection member according to another preferred embodiment of the present invention, and FIG. 22 is a typical sectional view of the connection member shown in FIG. 21.

Referring to these drawings, the connection member 100f includes two terminal connection units Af and Bf connected to each other and side extension parts 150f where circuit connection terminal parts for connection to an external circuit are located. Here, the external circuit connection terminal parts may be input and output terminals for power supply, detection terminals for voltage detection, or combinations thereof.

Each of the terminal connection units includes an outer circumferential contact part 110f formed in the shape corresponding to the external shape of an electrode terminal of a battery cell and contacting an electrode terminal of a lower battery cell (not shown) at a region adjacent to the outer circumference of the connection member, the outer circumferential contact part 110f having a predetermined width, an upward protruding part 120f extending from the outer circumferential contact part 110f toward a central axis of each terminal connection unit such that the upward protruding part 120f is tapered upward, and a central contact part 130f contacting an electrode terminal of a battery cell (not shown) located above the connection member 100f.

At the upward protruding part 120f and the central contact part 130f are formed cut-out parts 140f constructed in a bridge structure in which the cut-out parts 140f extend from the upward protruding part 120f to the central contact part 130f and successively extend from the central contact part 130f to the upward protruding part 120f.

The central contact part 130f has a contact interface w of a size equivalent to approximately 60% of the surface area W of the electrode terminal of the upper battery cell (not shown).

Meanwhile, the outer circumferential contact part 110f and the central contact part 130f are electrically connected to an anode terminal (not shown) of the lower battery cell and a cathode terminal (not shown) of the upper battery cell, respectively, in a physical contact manner.

Each cut-out part 140f is constructed in a structure in which a cut-out start point 141f and a cut-out end point 143f form an angle a of approximately 90 degrees under a condition that each cut-out part 140f does not reach the central axis 131f of the connection member 100f. Also, the cut-out parts 140f are radially arranged in a symmetrical structure in which the four cut-out parts 140f are symmetrically disposed about the central axis 131f of the connection member 100f. And the distance d1 between the central axis 131f of the connection member 100f and a region of the connection member 100f where the connection member 100f is the most adjacent to the central axis 131f of the connection member 100f is approximately 20% of the width d2 of the central contact part 130f.

Also, the respective cut-out parts 140f are cut out with a width d3 equivalent to approximately 130% of the thickness T of the connection member. And the respective cut-out parts 140f pass through the uppermost portion 121f of the upward protruding part 120f.

By the provision of the cut-out parts 140f, it is possible for the upward protruding part 120f to exhibit appropriate flexibility as well as elasticity. Consequently, it is possible to prevent the occurrence of an instantaneous short circuit of the battery cell due to an external factor, such as vibration, thereby continuously maintaining the electrical connection between the battery cells.

Figure 23:
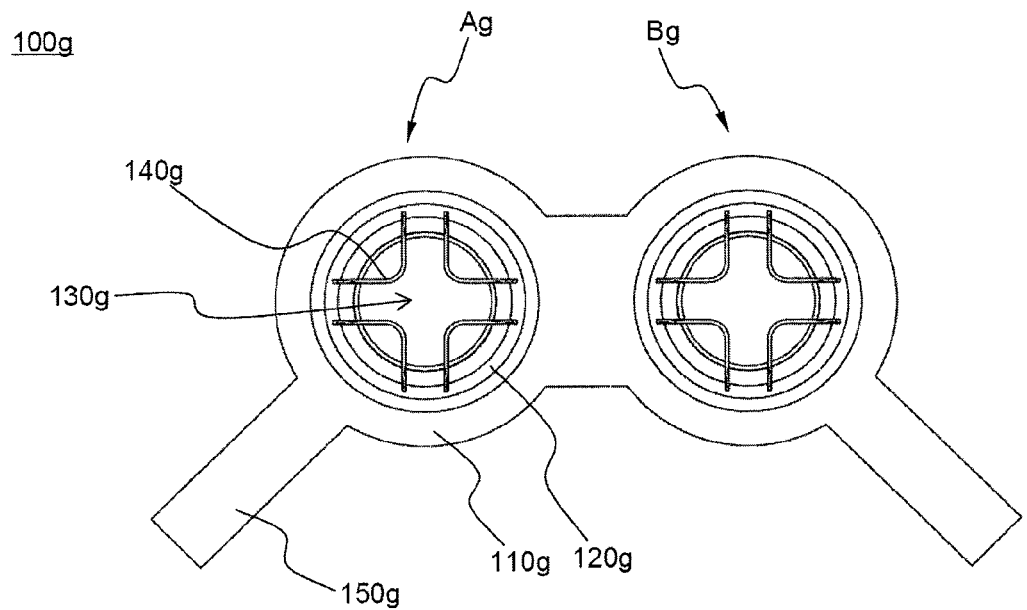
FIG. 23 is a plan view typically illustrating a connection member according to another preferred embodiment of the present invention.
Figure 24:
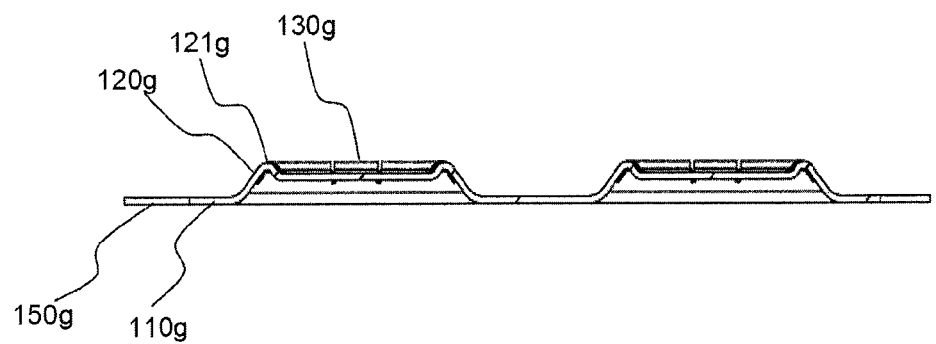
FIG. 24 is a typical sectional view of the connection member shown in FIG. 23.
Figure 25:
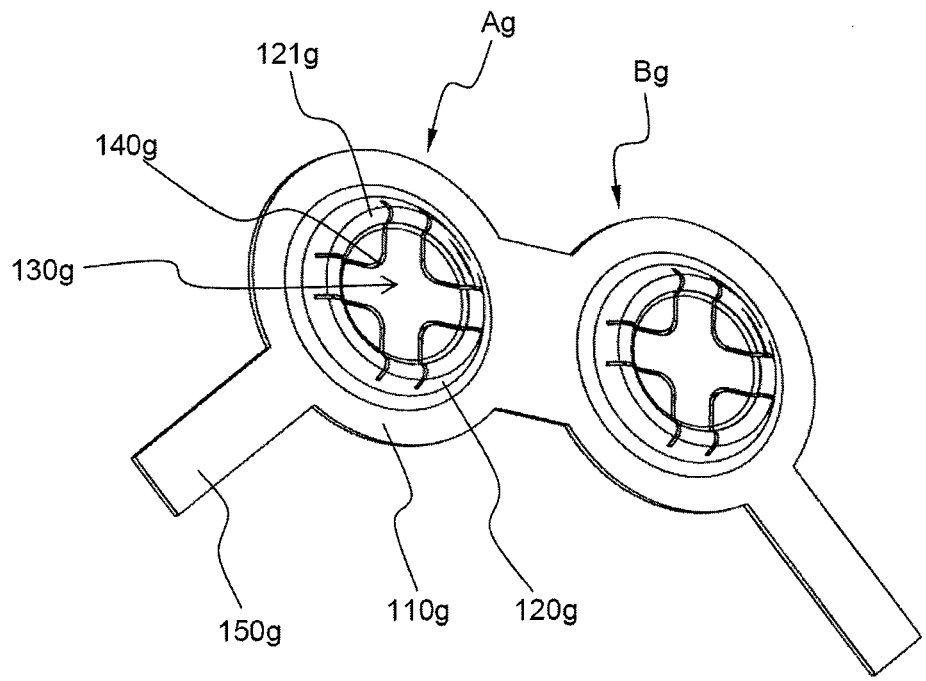
FIG. 25 is a perspective view of the connection member shown in FIG. 23.

FIG. 23 is a plan view typically illustrating a connection member according to another preferred embodiment of the present invention, FIG. 24 is a typical sectional view of the connection member shown in FIG. 23, and FIG. 25 is a perspective view of the connection member shown in FIG. 23.

Referring to these drawings, the connection member 100g includes two terminal connection units Ag and Bg connected to each other and side extension parts 150g where circuit connection terminal parts for connection to an external circuit are located.

Each of the terminal connection units includes an outer circumferential contact part 110g connected to an electrode terminal of a lower battery cell (not shown), an upward protruding part 120g extending from the outer circumferential contact part 110g toward a central axis of each terminal connection unit such that the upward protruding part 120g is tapered upward, and a central contact part 130g contacting an electrode terminal of a battery cell (not shown) located above the connection member 100g. At the upward protruding part 120g and the central contact part 130g are formed cut-out parts 140g constructed in a slit structure in which the cut-out parts 440 extend from the upward protruding part 120g to the central contact part 130g and successively extend from the central contact part 130g to the upward protruding part 120g.

Figure 26:
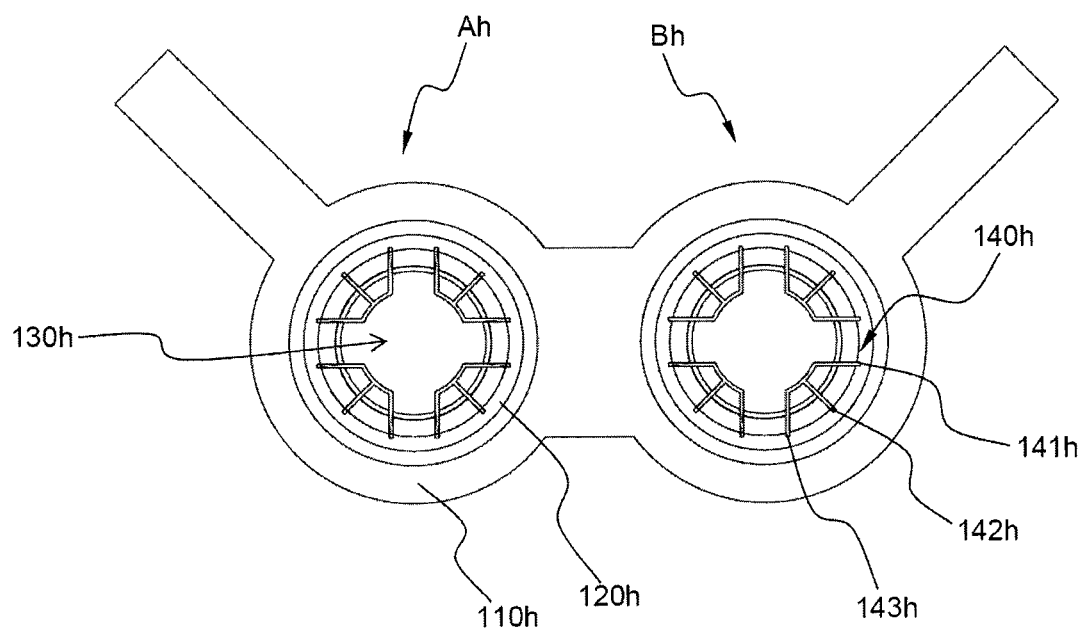
FIG. 26 is a plan view typically illustrating a connection member according to a further preferred embodiment of the present invention.
Figure 27:
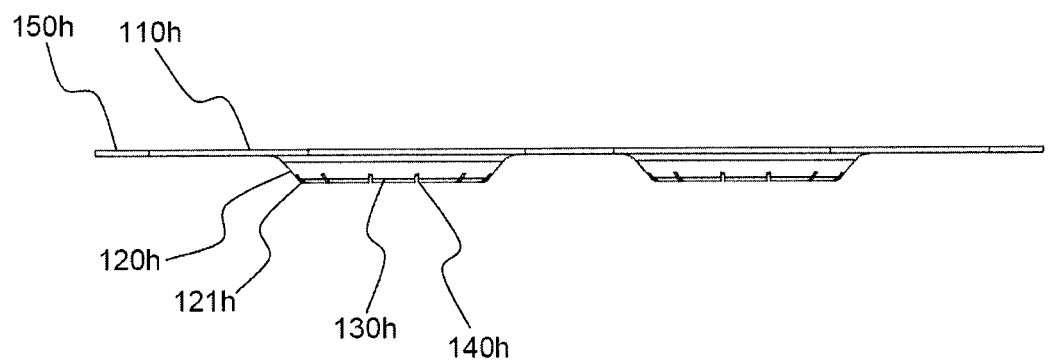
FIG. 27 is a typical sectional view of the connection member shown in FIG. 26.

FIG. 26 is a plan view typically illustrating a connection member according to a further preferred embodiment of the present invention, and FIG. 27 is a typical sectional view of the connection member shown in FIG. 26.

Referring to these drawings, the connection member 100h includes two terminal connection units Ah and Bh connected to each other and side extension parts 150h where circuit connection terminal parts for connection to an external circuit are located.

Each of the terminal connection units includes an outer circumferential contact part 110h contacting an electrode terminal of a lower battery cell (not shown), an upward protruding part 120h extending from the outer circumferential contact part 110h toward a central axis of each terminal connection unit such that the upward protruding part 120h is tapered upward, and a central contact part 130h contacting an electrode terminal of a battery cell (not shown) located above the connection member 100h.

At the upward protruding part 120h and the central contact part 130h are formed cut-out parts 140h constructed in a slit structure in which each cut-out part 140h extends from one cut-out start point 141h of the upward protruding part 120h to the central contact part 130h and successively extends from the central contact part 130h to two cut-out end points 142c and 143h of the upward protruding part 120h.

By the provision of the cut-out parts 140h, it is possible to control the elasticity of the upward protruding part 120h to a desired degree.

Industrial Applicability

As apparent from the above description, the connection member for secondary batteries according to the present invention does not need a welding or soldering process for electrical connection between electrode terminals of battery cells. Consequently, it is possible to prevent the occurrence of short circuits of the battery cells, which may be caused during welding, and to greatly reduce the defective production ratio. Also, it is possible to minimize the change in resistance at the connection regions through the stable coupling structure between the electrode terminals of the secondary battery cells and to greatly improve the production efficiency. In addition, when an external force, such as dropping or vibration, is applied to a battery pack, it is possible to protect the battery cells from the external force. Furthermore, it is possible to maintain the stable connection of the battery pack even when in use for a long period of time, while not causing the increase in size of the battery pack although the battery pack is constructed in an electrically connection structure not using welding.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A connection member for secondary batteries to achieve electrical connection in a battery pack including two or more cylindrical secondary batteries in a physical contact manner, the connection member comprising terminal connection units for electrically connecting two or more battery cells arranged in a lateral direction in a physical contact manner, each of the terminal connection units comprising:
    (a) an outer circumferential contact part configured to correspond to the external shape of an electrode terminal of the corresponding battery cell, the outer circumferential contact part contacting the electrode terminal of the corresponding battery cell at a region adjacent to the outer circumference of the electrode terminal, the outer circumferential contact part having a predetermined width;
    (b) upward protruding parts tapered upward from the outer circumferential contact part toward a central axis of each terminal connection unit for elastically supporting the corresponding battery cell;
    (c) a pressing part protruding from the upward protruding parts to a predetermined height toward the central axis of each terminal connection unit for achieving the physical contact between the battery cells and the connection member; and
    (d) a depressed part formed on the central axis of each terminal connection unit in a depressed shape by a depth less than the sum of the height of the upward protruding parts and the height of the pressing part,
    wherein the terminal connection units are electrically connected to each other in correspondence to the number of the battery cells arranged in the lateral direction,
    wherein the upward protruding part is provided with two or more cut-off parts, having a predetermined width, formed toward the central axis of each terminal connection unit for controlling an elastic force, and
    wherein the cut-off parts are arranged in the shape of a whirlpool to effectively provide a flexible elastic force.

2. The connection member according to claim 1, wherein the terminal connection unit is provided at one side thereof with a circuit connection terminal part.

3. A battery pack constructed in a structure in which a connection member for secondary batteries according to claim 1 is mounted between electrode terminals of battery cells to achieve the electrical connection between the battery cells.

4. A laptop computer including a battery pack according to claim 3 as a power source.

* * * * *